United States Patent [19]
Suga et al.

[11] Patent Number: 5,457,494
[45] Date of Patent: Oct. 10, 1995

[54] IMAGE PICKUP SIGNAL PROCESSING APPARATUS

[75] Inventors: Akira Suga, Tokyo; Takashi Sasaki; Kazuyuki Matoba, both of Yokohama; Akihiko Shiraishi, Kawasaki, all of Japan

[73] Assignee: Canon Kabushiki Kaisha, Tokyo, Japan

[21] Appl. No.: 438,090

[22] Filed: Nov. 20, 1989

[30]     Foreign Application Priority Data

Nov. 21, 1988   [JP]   Japan ................................. 63-292288
Nov. 22, 1988   [JP]   Japan ................................. 63-296732
Jan. 31, 1989   [JP]   Japan ................................. 1-019773

[51] Int. Cl.$^6$ ............................ H04N 9/70; H04N 9/77
[52] U.S. Cl. ...................... 348/229; 348/230; 348/254; 348/260; 348/272
[58] Field of Search ........................... 358/41, 48, 44, 358/43, 21 R, 75, 80, 32, 164, 30, 34, 43, 48, 166, 169, 29, 27, 50, 48, 47, 160; 341/139; 348/222, 241, 242, 243, 254, 256, 255, 257, 266, 272, 229, 230, 231, 234, 237; H04N 9/70, 9/77, 9/4, 5/235

[56]             References Cited

U.S. PATENT DOCUMENTS 4,395,732   7/1983   Upton .......................... 358/160
4,473,839   9/1984   Noda ............................ 358/41
4,638,352   1/1987   Noda et al. .................. 358/44
4,714,955   12/1987  Nishimura et al. ........... 358/44
4,851,842   7/1989   Iwamatsu ..................... 341/139
4,860,103   8/1989   Azam et al. .................. 358/160
4,891,690   1/1990   Hasegawa et al. ........... 358/75
4,931,864   6/1990   Kawamura et al. .......... 358/80
4,963,978   10/1990  Ueda et al. .................. 358/80

FOREIGN PATENT DOCUMENTS 0127883   7/1985   Japan ........................... 358/44
0105591   5/1988   Japan ........................... H04N 9/70

Primary Examiner—James J. Groody
Assistant Examiner—Michael H. Lee
Attorney, Agent, or Firm—Fitzpatrick, Cella, Harper & Scinto

[57]             ABSTRACT

An image pickup signal processing apparatus for generating a digital luminance signal and digital color difference signals from output signals from a solid-state image pickup element, includes subtracters for generating primary color signals or color difference signals from the output signals from the solid-state image pickup element, and an A/D converter for converting the primary color or color difference signals output from the subtracters into digital signals.

25 Claims, 21 Drawing Sheets

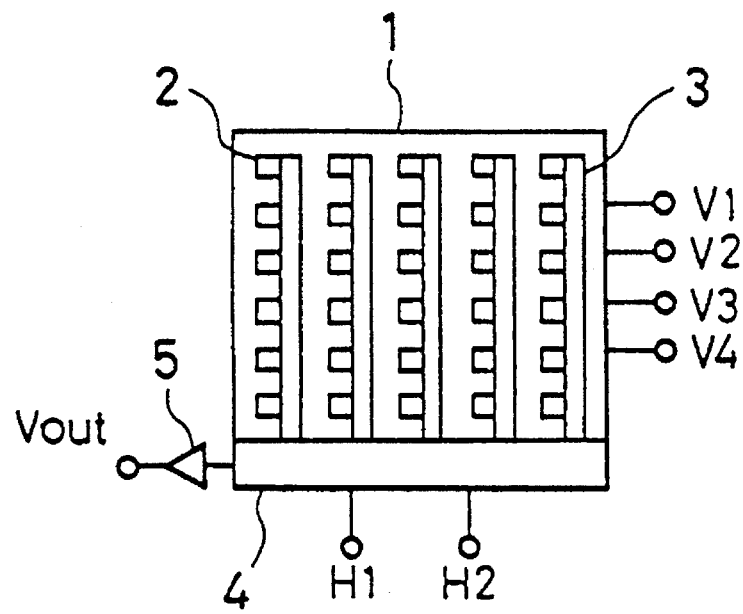

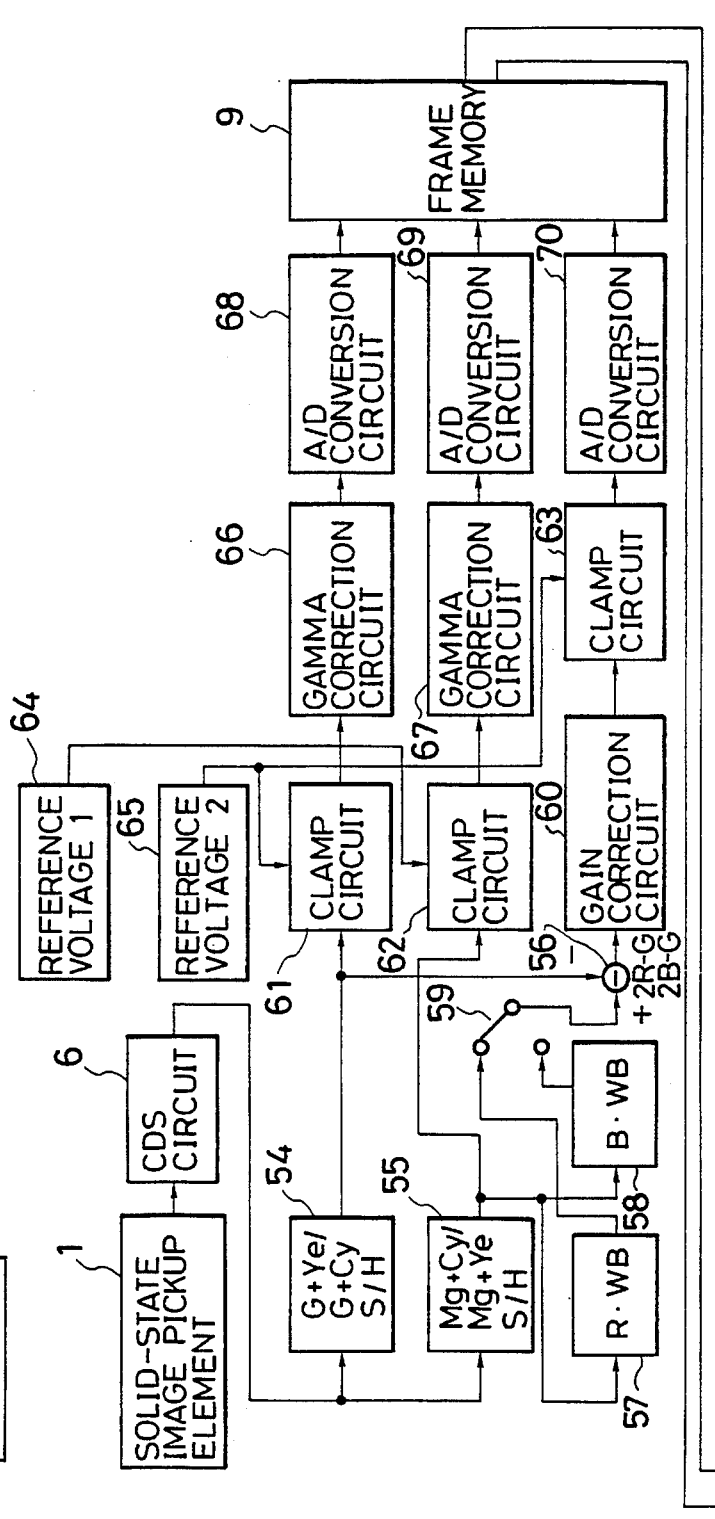

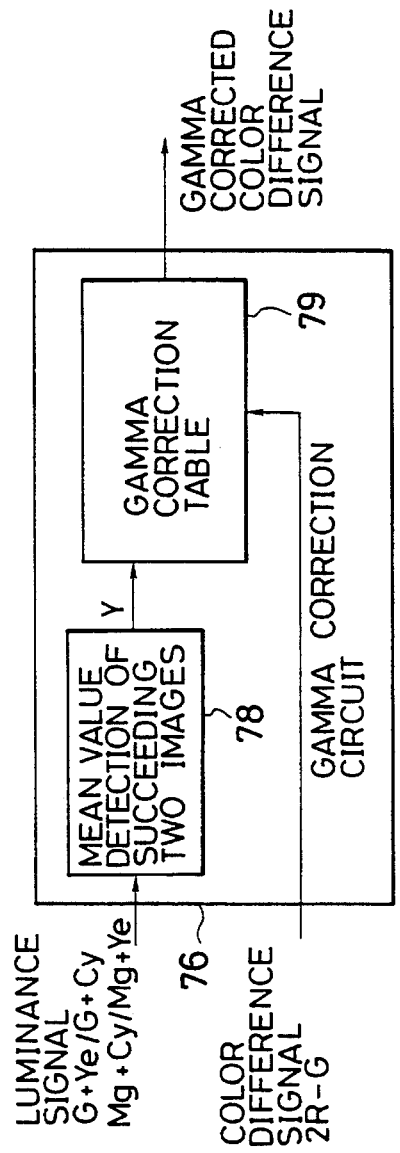

FIG.18

| Ce | Ce | | |
|---|---|---|---|
| Mg | Gr | Mg | Gr |
| Gr | Mg | Gr | Mg |
| Cy | Ye | Cy | Ye |
| Ye | Cy | Ye | Cy |

(Row 1 and Row 2 labeled Ce on the left)

IMAGE PICKUP SIGNAL PROCESSING APPARATUS

BACKGROUND OF THE INVENTION

1. Field of the Invention

The present invention relates to an image pickup signal processing apparatus for A/D-converting an output signal from a solid-state image pickup element and for extracting a luminance signal and color signals.

2. Related Background Art

FIG. 1 is a schematic view of an interline CCD used as a conventional solid-state image pickup element. An interline CCD 1 comprises a plurality of photodiodes 2 for converting light incident on a light-receiving unit of the CCD 1 into charges and accumulating the charges, and a vertical transfer unit 3 for transferring the charges from the photodiodes 2 in units of stages per 1H (one horizontal period). The vertical transfer unit 3 includes transfer electrodes V1 to V4. The transfer electrode V1 also serves as a transfer gate for transferring the charges of the odd-numbered lines of the photodiodes 2 to the vertical transfer unit 3. The transfer electrode V3 serves as a transfer gate for transferring the charges of the even-numbered lines of the photodiodes 2. The vertical transfer unit 3 is driven in response to 4-phase transfer pulses. The interline CCD also includes a horizontal transfer unit 4 for horizontally transferring the charges transferred in units of stages each per 1H, an output amplifier 5 for converting the charge into a voltage and outputting the voltage, and an output terminal VOUT. The horizontal scan unit 4 includes transfer electrodes H1 and H2.

FIG. 2 shows the layout of a color filter arranged on the CCD 1. This filter comprises a stripe filter in which three different colors are repeated in an order of Ye (yellow), G (green), and Cy (cyan) in the horizontal direction.

FIG. 3 is a timing chart for reading the charges from the CCD 1. For example, at time t1 of the A field, the transfer electrodes V1 and V3 are set at Hi (high) level, so that charges of the two adjacent lines of the photodiodes 2 are added to each other. The sum is transferred through the vertical transfer unit 3 in units of stages each per 1H toward the horizontal scan unit 4. The charge transferred to the horizontal scan unit 4 during a horizontal blanking period is output from the output amplifier 5 in an order of Ye, G, Cy, . . . .

FIG. 4 is a block diagram showing a circuit arrangement of a conventional image pickup signal processing apparatus for processing an output signal from the CCD 1. The image pickup processing apparatus includes a CDS circuit 6 for eliminating noise of the CCD 1, a clamp circuit 7 for fixing the output potential of the CDS circuit 6 at a predetermined value, an A/D conversion circuit 8 for performing A/D conversion, a frame memory 9, a digital signal processing portion 10 for performing arithmetic operations of the data obtained from the frame memory 9 through a data bus 11 and for generating a luminance signal and color signals, a D/A conversion circuit 12 for D/A-converting a luminance signal output from the digital signal processing portion 10, D/A conversion circuits 13 and 14 for D/A-converting color difference signals, respectively, a low-pass filter (LPF) 15 for limiting the band of the luminance signal, and low-pass filters 16 and 17 for limiting the bands of the color difference signals. The low-pass filters 15, 16, and 17 output a luminance signal Y and color difference signals R–Y and B–Y, respectively.

FIG. 5 is a block diagram showing a detailed arrangement of the digital signal processing portion 10. The processing portion 10 includes a latch circuit 18 for reading out the Ye signal from the frame memory 9 and latching the readout Ye signal, a latch circuit 19 for latching the G signal as in the Ye signal, a latch circuit 20 for latching the Cy signal as in the Ye signal, a subtracter 21 for subtracting the G signal from the Ye signal to generate the R (red) signal, a subtracter 22 for subtracting the G signal from the Cy signal to generate the B (blue) signal, a gamma correction circuit 23 for gamma-correcting the signals read out from the frame memory 9 in an order of Ye, G, Cy, . . . and outputting a digital luminance signal Y(D), a gamma correction circuit 24 for gamma-correcting the readout data into the R signal, a gamma correction circuit 25 for gamma-correcting the readout data into the G signal, a gamma correction circuit 26 for gamma-correcting the readout signal into the B signal, and a matrix operation circuit 27 for performing matrix calculations of the gamma-corrected R, G, and B signals to generate digital color difference signals R–Y(D) and B–Y(D).

In the image pickup processing apparatus having the above arrangement, differences between complementary color signals output from the CCD 1 and digitized by the A/D conversion circuit 8 are calculated by the subtracters 21 and 22 in the digital signal processing portion 10 to generate primary color signals. All the signals are gamma-corrected and then converted into analog signals again. The converted analog signals are then output to an external circuit.

In the conventional image pickup processing apparatus, the differences between the complementary color signals from the solid-state image pickup element and converted into digital signals by the A/D converter are calculated to generate the primary color signals. In a quantization process using about 8 bits, the bit resolution of the color signals upon completion of the calculations of the differences is degraded. The influence of quantization noise cannot be neglected, and an S/N ratio of the color signal is undesirably decreased.

SUMMARY OF THE INVENTION

The present invention has been made in consideration of the above problems described above, and has as its object to provide an image pickup signal processing apparatus capable of increasing the bit resolution of color signals, suppressing influences of quantization noise, and increasing S/N ratios of the color signals.

It is another object of the present invention to reduce a circuit size and reduce the cost by using only one A/D converter.

According to an aspect of the present invention, there is provided an image pickup signal processing apparatus for generating a digital luminance signal and digital color difference signals from output signals from a solid-state image pickup element, comprising subtracters for generating primary color signals or color difference signals from the output signals from the solid-state image pickup element, and an A/D converter for converting difference signals into digital signals.

In the image pickup signal processing apparatus of this aspect, since A/D conversion is performed after differences for extracting the primary color signals or the color difference signals are calculated, the bit resolution of the color signals can be increased. Therefore, quantization noise of the color signals is not so conspicuous even if an A/D converter of about 8 bits is used.

According to another aspect of the present invention, there is provided a digital signal processing apparatus comprising a color image pickup means using a complementary color filter, an A/D converter for performing A/D conversion of signals corresponding to differences between different color signals from the color image pickup means, a color signal processing means for forming color signals by using outputs from the A/D converter, a decoder for decoding original color signals from outputs from the A/D converter, and a luminance signal processing unit for forming a luminance signal by using an output from the decoder.

According to this aspect, there are provided one A/D converter for calculating differences between the different color signals and the decoder for decoding the original signals from the outputs from the A/D converter, thereby realizing the digital signal processing apparatus comprising only one A/D converter having small quantization noise of the color signals.

In addition, with the above arrangement, the quantization noise of the decoded luminance signal has a level almost equal to that of the color difference signal. Even if only the A/D converter of, e.g., 8 bits is used, the decoded luminance signal can have high precision of 8 or more bits (normally 9 to 10 bits).

According to still another aspect of the present invention, there is provided an image pickup signal processing apparatus comprising a color image pickup means using a complementary color filter, a means for receiving outputs from the color image pickup means and separating all complementary color signals, a differential amplifying means for inputting a plurality of complementary color signals separated by the separating means, a means for non-linearly A/D-converting an output from the differential amplifying means, and processing means for performing linear processing of an output from the A/D-converting mean, wherein a small signal level is quantized by a larger number of quantization levels.

This aspect has the same effect as in the first aspect. In addition, the small color difference signal level can be quantized by a larger number of quantization levels, and a large color difference signal level is quantized by a smaller number of quantization levels, thereby suppressing visual quantization noise on a screen.

BRIEF DESCRIPTION OF THE DRAWINGS

FIG. 1 is a schematic view of an interline CCD as a conventional solid-state image pickup element;

FIG. 2 is a view for explaining the layout of the color filter of the CCD shown in FIG. 1;

FIGS. 7A and 7B are block diagrams showing a circuit arrangement according to another embodiment of the present invention;

FIG. 10 is a view for explaining an operation of a gamma correction circuit;

FIG. 12 is a view showing the layout of a color filter of the embodiment shown in FIG. 11.

FIG. 18 is a view showing the layout of a complementary color filter of the embodiment shown in FIG. 17;

DETAILED DESCRIPTION OF THE PREFERRED EMBODIMENTS

Figure 3:
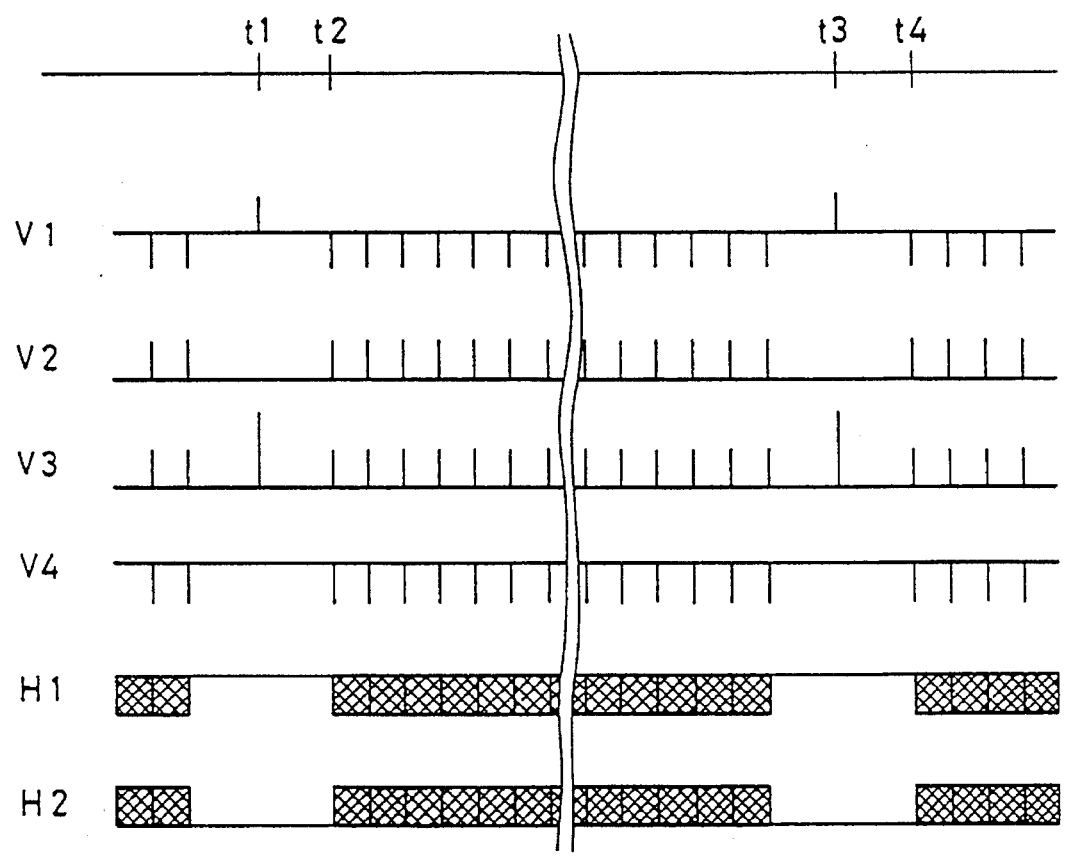
FIG. 3 is a timing chart showing timings for reading charges from the CCD 1.
Figure 4:
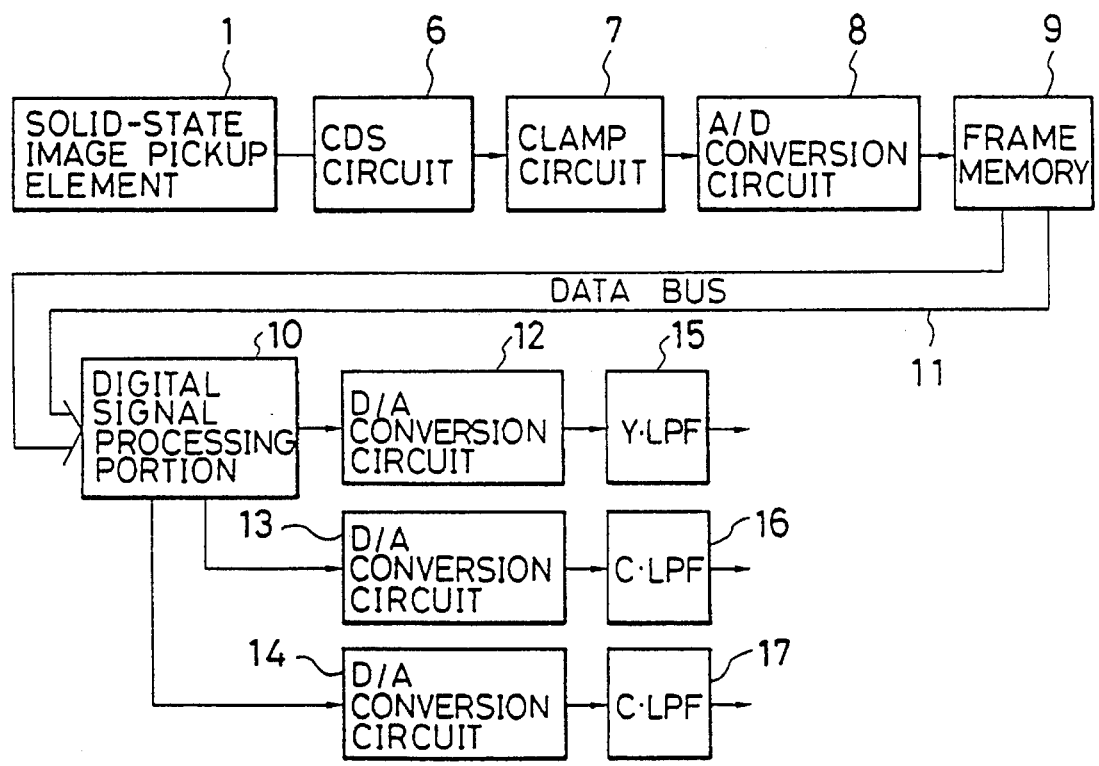
FIG. 4 is a block diagram showing a circuit arrangement of the conventional image pickup signal processing apparatus.
Figure 5:
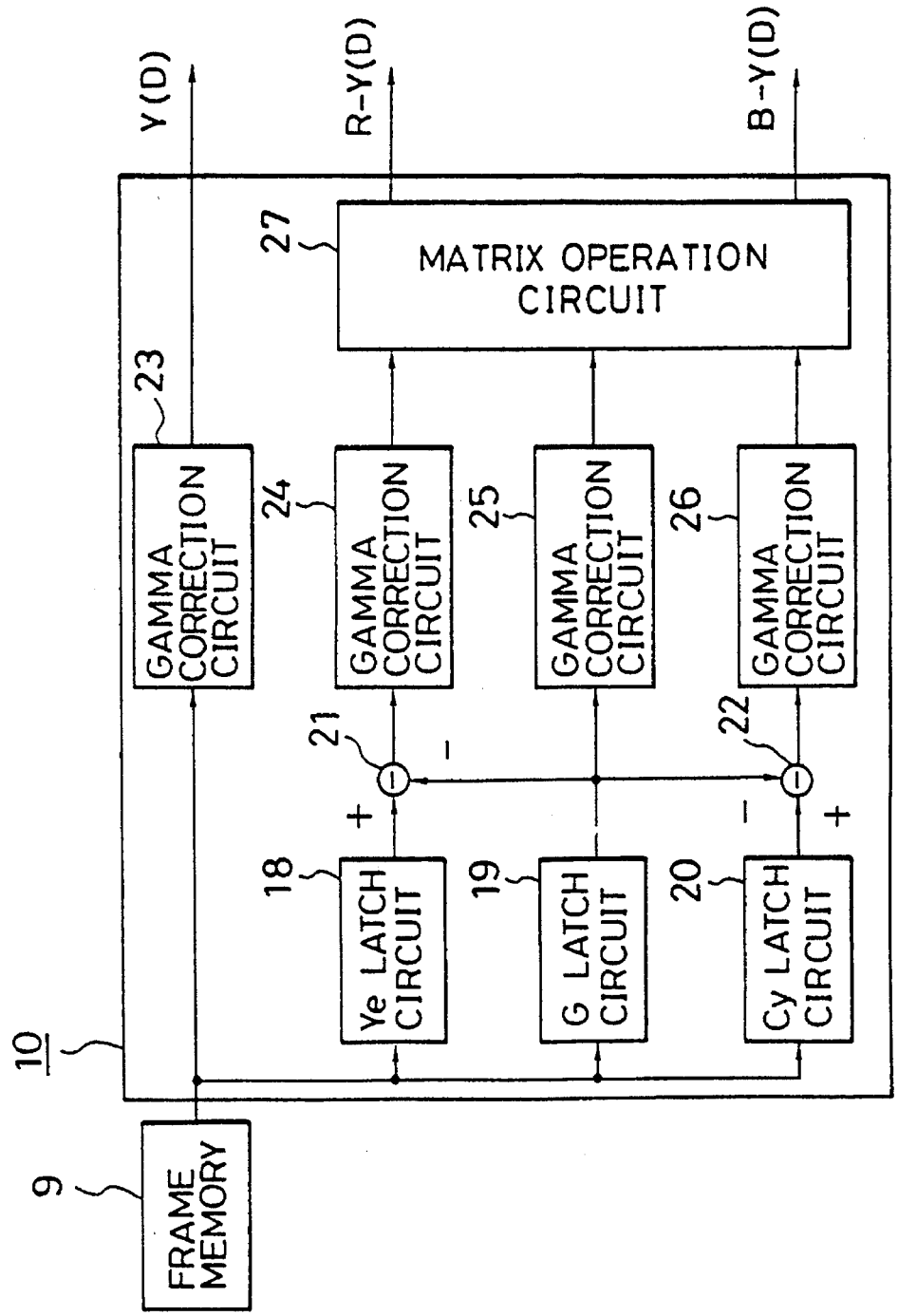
FIG. 5 is a block diagram showing a detailed arrangement of the digital signal processing portion.
Figure 6A:
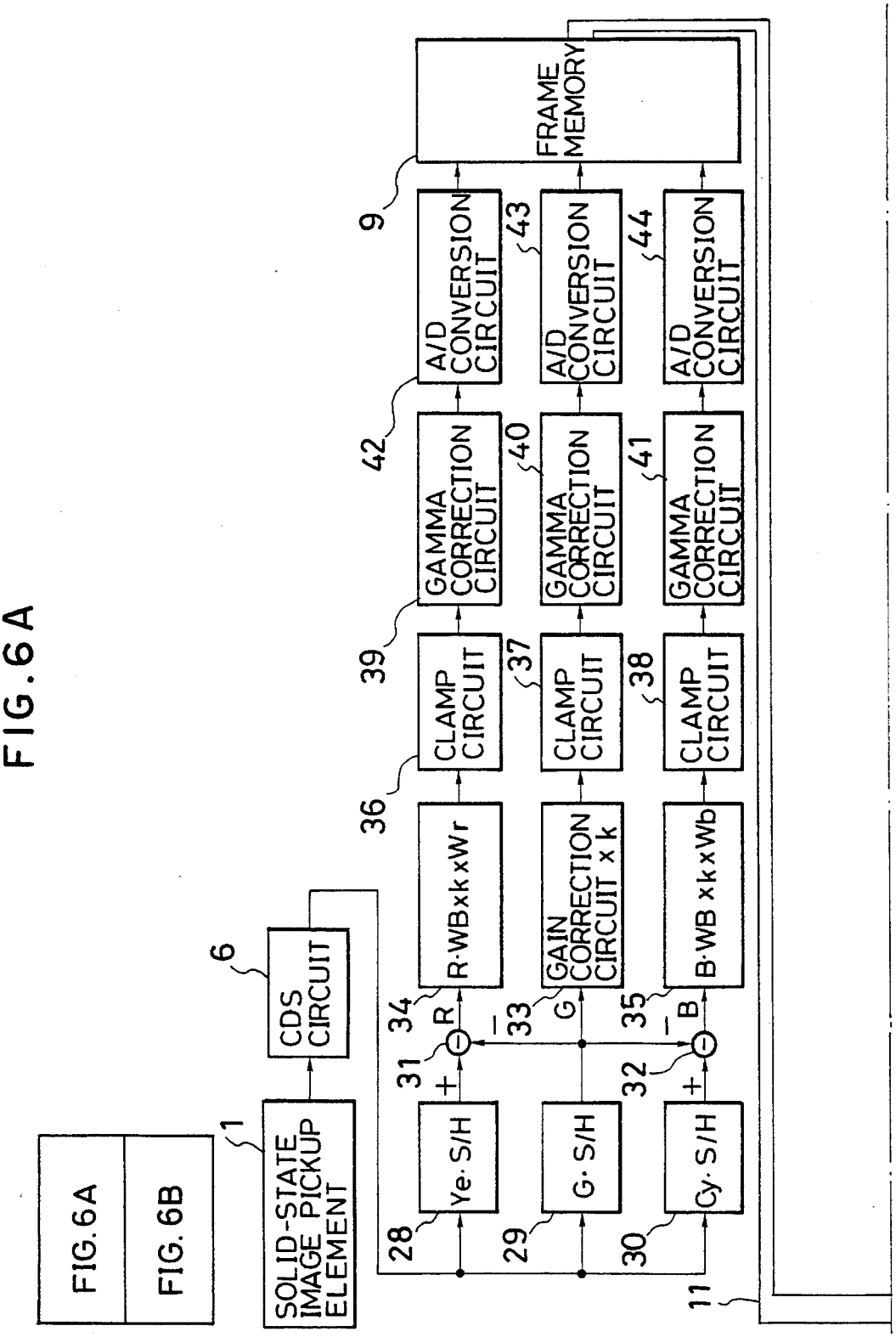
FIGS. 6A and 6B are block diagrams showing a circuit arrangement according to an embodiment of the present invention.
Figure 6B:
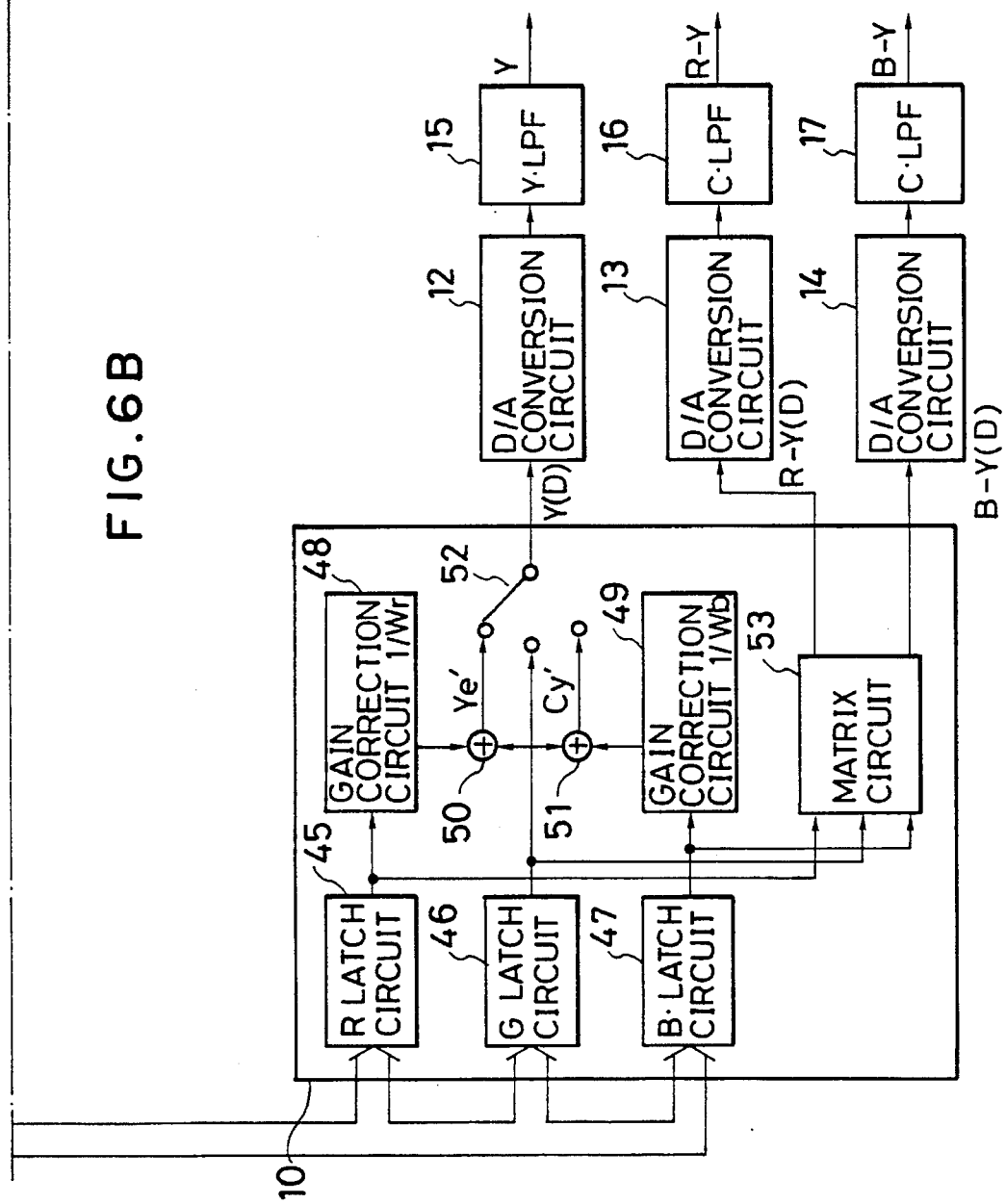

FIGS. 6A and 6B are block diagrams showing a circuit arrangement according to an embodiment of the present invention. The same reference numerals as in FIG. 4 denote the same parts in FIG. 6. A sample/hold circuit (Ye S/H) 28 samples and holds the Ye signal. Sample/hold circuits 29 and 30 sample and hold the G and Cy signals, respectively. Subtracters 31 and 32 subtract the G signal from the Ye signal and the Cy signal to generate the R (red) and B (blue) signals, respectively. A gain correction circuit 33 multiplies the G signal with k to fully utilize the A/D conversion bit resolution in the subsequent stage. The gain k can be set stepwise in accordance with the brightness of the object. A white balance circuit 34 multiplies the amplitude of the R signal in a white portion of an object with a gain of k × Wr and equalizes this amplitude with that of the gain-controlled G signal, thereby correcting the amplitude of the R signal in accordance with a color temperature of a light source. A white balance circuit 35 multiples the amplitude of the B signal with a gain of k × Wb so as to equalize this amplitude with that of the G signal in a white portion of the object, thereby correcting the amplitude of the B signal in the same manner as described above. Clamp circuits 36, 37, and 38 clamp DC (direct current) levels of the R, G, and B signals to a reference potential. Gamma correction circuits 39, 40, and 41 perform gamma correction of the R, G, and B signals, respectively. A/D conversion circuits 42, 43, and 44 perform A/D conversion of the R, G, and B signals, respectively. Digital signals from the A/D conversion circuits 42, 43, and 44 are stored in a frame memory 9. A latch circuit 45 reads out the R signal from the frame memory 9 and latches the readout signal. A latch circuit 46 reads out the G signal from the frame memory 9 and latches the readout signal. A latch circuit 47 reads out the B signal from the frame memory 9 and latches the readout signal. A gain correction circuit 48 multiples the R signal with a gain of 1/Wr. A gain correction circuit 49 multiplies the B signal with a gain of 1/Wb. An adder 50 adds the gain-corrected R and G signals to generate the Ye' signal. An adder 51 adds the gain-corrected B and G signals to generate the Cy' signal. A switch 52 switches the Ye', G, and Cy' signals in synchronism with a clock having a period of one pixel. A digital luminance signal Y(D) is output from the switch 52. A matrix circuit 53 performs arithmetic operations of the R, G, and G signals to generate digital color difference signals R−Y(D) and B−Y(D).

In the image pickup signal processing apparatus having the above arrangement, the complementary color signals from the CCD 1 are separated into pure color signals, i.e., the R, G, and B color signals, and these signals are input to the A/D conversion circuits 42 to 44, respectively. In this case, in order to maximize the signal input range, A/D conversion is performed after these signals are gain-corrected. As compared with a conventional case wherein the pure color signals are obtained by subtractions after the complementary color signals are A/D converted, influences of quantization noise on the color signals can be greatly suppressed. For this reason, S/N ratios of the color signals can be greatly increased. In addition, digital calculations of the pure color signals read out from the frame memory are performed to reproduce the complementary color signals, and these complementary colors are used to generate the luminance signal. Therefore, a high-quality luminance signal almost free from folded noise, i.e., given as an advantage of the complementary color filter, can be obtained.

Figure 7B:
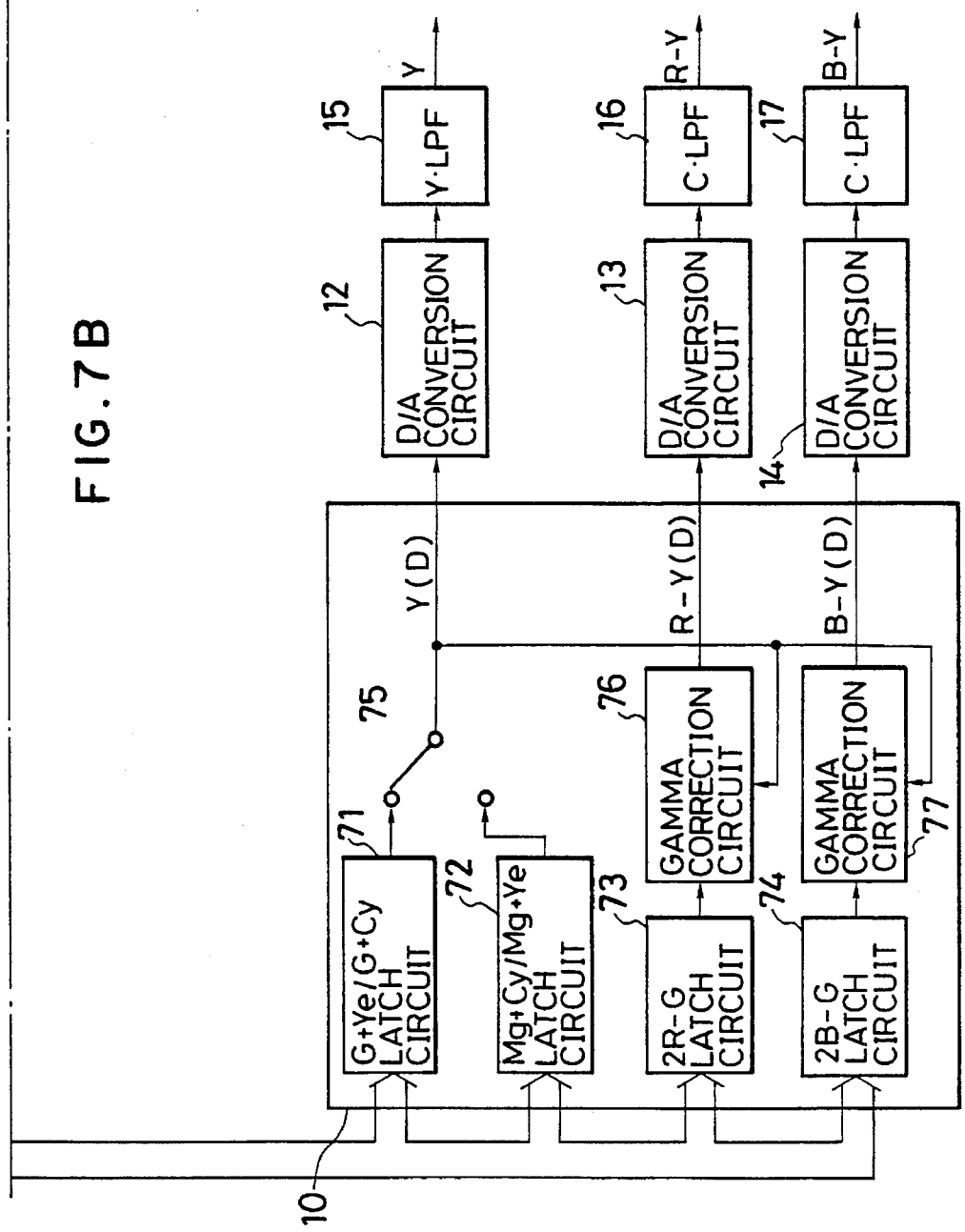

FIGS. 7A and 7B are block diagrams showing a circuit arrangement according to another embodiment of the present invention. In this embodiment, a CCD 1 comprises a complementary color mosaic filter. Color signals having high S/N ratios can be obtained from the outputs form the CCD 1.

Figure 8:
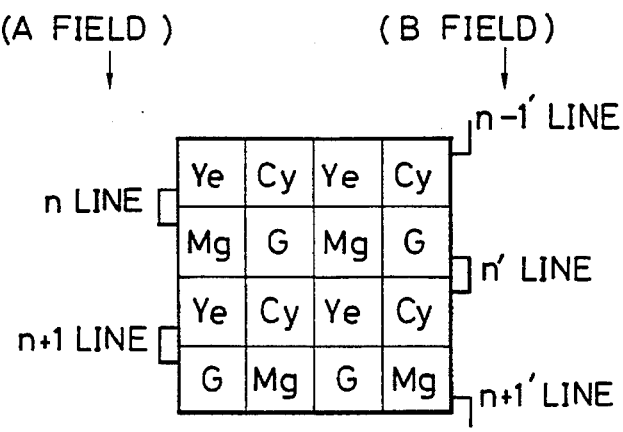
FIG. 8 is a view for explaining the layout of a complementary mosaic filter arranged on the CCD shown in FIG. 7.

The layout of the complementary color mosaic filter is shown in FIG. 8. A luminance signal and line-sequential color difference signals are obtained from the output signals from the CCD 1 having the above filter in accordance with the following equations. In this case, charges of two adjacent lines are added every field, as shown in FIG. 8, and the sums are calculated as follows, thereby obtaining the luminance signal and the color difference signals.

A Field:
Nth Line:

luminance signal: Ye(n)+Mg(n)+Cy(n)+G(n)=(R+G)+ (R+B)+(G+B)+(G)=2R+3G+2B color signal: Ye(n)+Mg(n)−{Cy(n)+G(n)}={(R+G)+(R+ B)}−{(B+G)+G}=2R−G (N+1)th Line:

luminance signal: Ye(n+1)+G(n+1)+Cy(n+1)+Mg(n+1)= 2R+3G+2B color signal: Cy(n+1)+Mg(n+1)−{Ye(n+1)+G(n+1)}= 2B−G B Field:
N'th Line:

luminance signal: Mg(n')+Ye(n')+G(n')+Cy(n')=2R+3G+ 2B color signal: Mg(n')+Ye(n')−{G(n')+Cy(n')}=2R−G (N+1')th Line:

luminance signal: G(n+1)+Ye(n+1)+Mg(n+1')+Cy(n+1')= 2R+3G+2B color signal: Mg(n+1')+Cy(n+1')−{G(n+1')+Ye(n+1')}= 2B−G Referring to FIG. 7, a sample/hold circuit 54 samples and holds the (G+Cy) signal on the nth line and the (G+Ye) signal on the (n+1)th line. A sample/hold circuit 55 samples and holds the (Ye+Mg) signal on the nth line and the (Mg+Cy) signal on the (n+1)th line. A subtracter 56 calculates differences between outputs from the sample/hold circuits 54 and 55 and generates color difference signals 2R−G and 2B−G every horizontal scan period. White balance circuits 57 and 58 correct gains during subtraction operations so as to nullify a difference between the color difference signals on a white object in accordance with a color temperature of a light source. A switch 59 is operated every horizontal scan period so as to line-sequentially obtain the color difference signals 2R−G and 2B−G. A gain correction circuit 60 corrects amplitudes of the color difference signals so as to effectively utilize the A/D conversion bit resolution in the subsequent stage. Clamp circuits 61, 62, and 63 fix DC levels of output signals from the sample/hold circuits 54 and 55, and the gain correction circuit 60, respectively. A reference potential 1 generation source 64 generates a reference potential for the clamp circuits 61 and 62. A reference potential 2 generation source 65 generates a reference potential for the clamp circuit 63. Gamma correction circuits 66 and 67 receive outputs from the clamp circuits 61 and 62 and perform gamma correction of the clamped signals. A/D conversion circuits 68, 69, and 70 convert outputs from the gamma correction circuits 66 and 67 and the clamp circuit 63 and store digital signals in a frame memory 9. A latch circuit 71 reads out the (G+Ye) or (G+Cy) signal from the frame memory 9 and latches the readout signal. A latch circuit 72 reads out the (Mg+Cy) or (Mg+Ye) signal from the frame memory 9 and latches the readout signal. A latch circuit 73 reads out the (2R−G) signal from the frame memory 9 and latches the readout signal. A latch circuit 74 reads out the (2B−G) signal from the frame memory 9 and latches the readout signal. A switch 75 repeatedly switches between signals latched by the latch circuits 71 and 72 every pixel period. An output from the switch 75 serves as a digital luminance signal Y(D). Gamma correction circuits 76 and 77 output digital color difference signals R−Y(D) and B−Y(D).

Figure 9A:
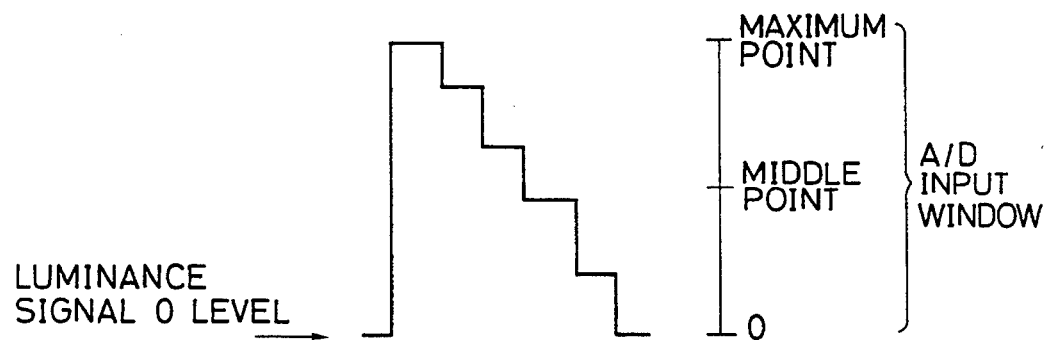
FIGS. 9A and 9B are views for explaining a method of determining reference potential 1 and reference potential 2 of the embodiment.
Figure 9B:
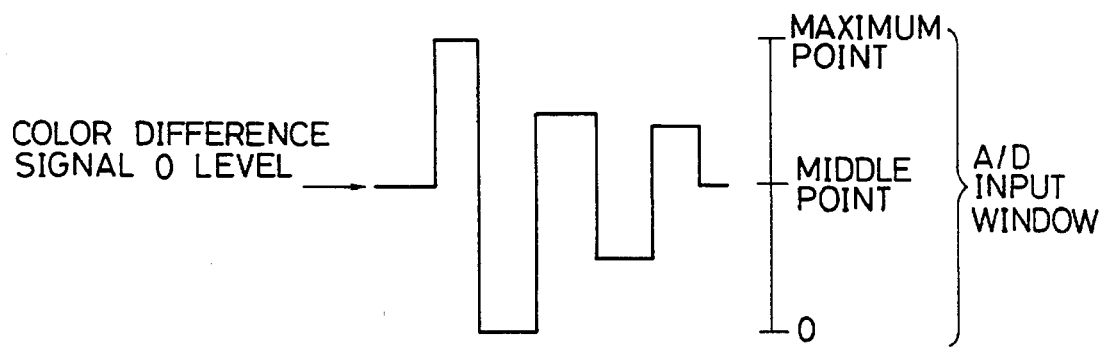

FIGS. 9A and 9B are views for explaining a method of determining DC reference potential 1 and DC reference potential 2, shown in FIG. 7. Reference potential 1 is a reference potential for determining a potential for A/D-converting the (G+Ye), (G+Cy), (Mg+Cy), and (Mg+Ye) signals for generating a luminance signal. In order to utilize the maximum points of the resolutions of the A/D conversion circuits 68 and 69, reference potential 1 must be set such that a black level in FIG. 9A is set to be 0 level of an A/D input window. However, as for reference potential 2, since the color difference signals have positive and negative polarities, reference potential 2 is preferably set such that the 0 level of the color difference signal is set to be the middle point of the A/D input window as shown in FIG. 9B. That is, the 0 level of the color difference signal is set to be the middle point of the input range of the A/D converter.

FIG. 10 is a diagram for explaining an operation of the gamma correction circuit 76 (or 77) shown in FIG. 7. More specifically, FIG. 10 shows the operation of the gamma correction circuit 76. Gamma-corrected color difference signals can be accurately obtained upon generation of color difference signals by calculations of gamma-corrected pure color signals. However, since no pure color signals cannot be obtained in this case, approximate gamma correction of the color difference signals is directly performed. That is, correction values of gamma correction cannot be directly derived from the levels of the color difference signals. A level of a luminance level is detected by a mean value detection circuit 78 for performing mean value detection of succeeding two images (pixels). A gamma correction table (two-dimensional) table 79 for obtaining a value of gamma-corrected color difference signal is referred to by the detected level of the luminance signal and levels of color difference signals, thereby approximately performing gamma correction of the color difference signals without converting the color difference signals to the pure color signals.

In this embodiment, subtraction processing for generating color difference signals prior to A/D conversion is performed. Therefore, degradation in the bit resolution of the color difference signals by the subtraction after the A/D conversion can be prevented as in the previous embodiment. Therefore, a high-quality color difference signal having a high S/N ratio almost free from an influence of quantization noise can be obtained.

As described above, according to the present invention, A/D conversion is performed after the subtraction operation for extracting the primary color signals or the color difference signals. Therefore, the bit resolution of the color signals can be improved, the influence of quantization noise can be suppressed, and the S/N ratios of the color signals can be increased.

Still another embodiment for suppressing quantization noise and simplifying a circuit arrangement to reduce cost will be described below.

Figure 11:
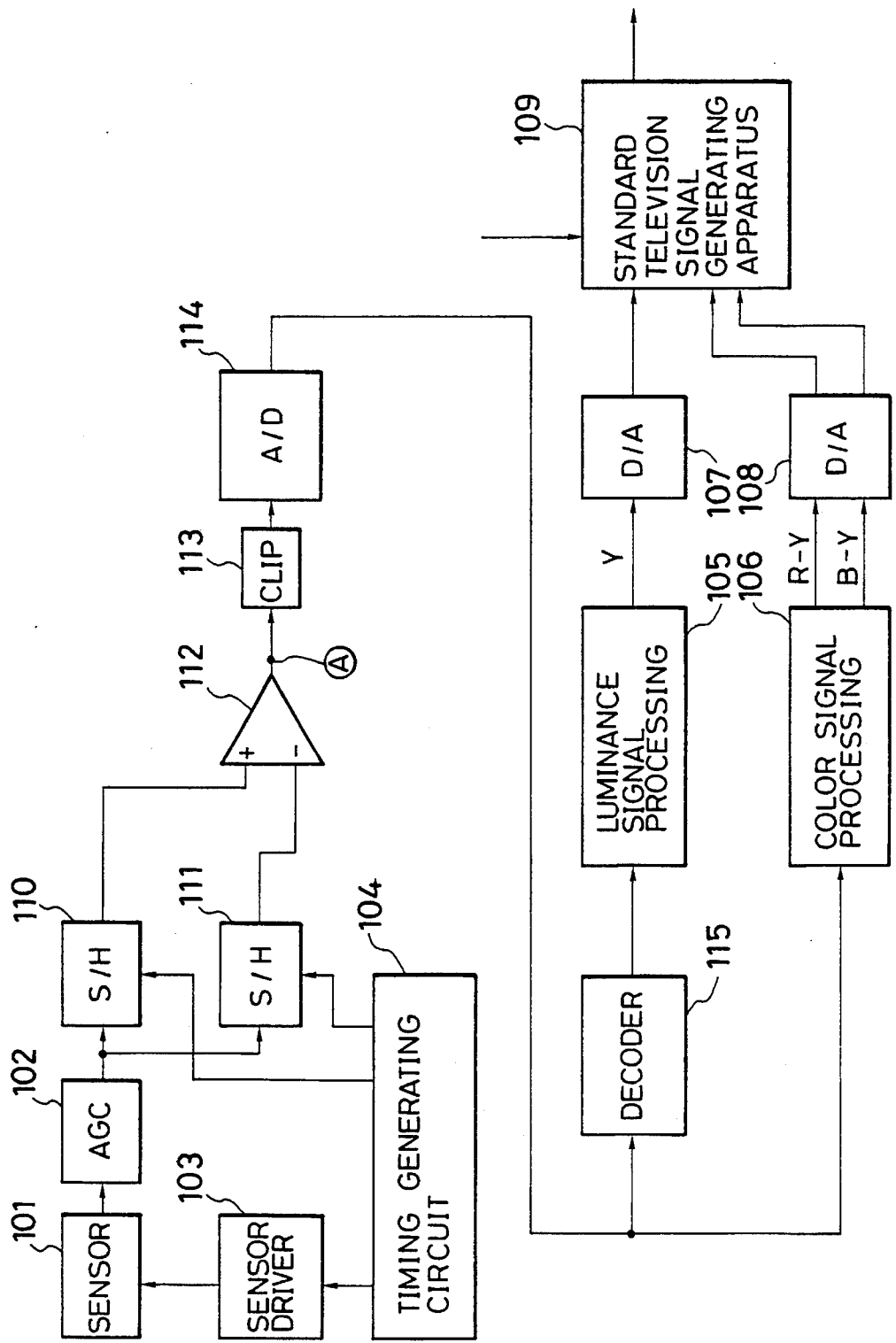
FIG. 11 is a block diagram showing an arrangement according to still another embodiment of the present invention.

FIG. 11 is a block diagram of an apparatus for processing a signal from a video camera. A sensor 101 comprises, e.g., a CCD image pickup element, and a complementary color filter shown in FIG. 12 is formed on the CCD image pickup element in correspondence with each pixel cell Ce. A driver 103 reads signals of two adjacent lines by interlaced scanning.

The gain of the read signal is adjusted by an AGC circuit 102, and the gain-controlled signal is input to two sample/hold circuits 110 and 111. Pulses P1 and P2 are supplied from a timing generating circuit 104 to the sample/hold circuits 110 and 111. As indicated by circles in waveforms (b) and (c) of FIG. 13, the pulses P1 and P2 are synchronized with a period twice that of a read clock fc and have opposite polarities.

Waveforms (a), (b), (c), and (d) in FIG. 13 represent outputs from the AGC circuit 102, outputs from the sample/hold circuits 110 and 111, and an output from a differential amplifier 112, respectively. An interval between the graduation marks of the scale is a time interval T (=1/fc). The timings of the pulses P1 and P2 are represented by circles in the waveforms (b) and (c). A waveform (e) represents timings of pulses for operating an A/D converter 114.

For example, during the first horizontal scan period, outputs from the sample/hold circuits 110 and 111 are (Mg+Cy) and (Gr+Ye) signals, respectively. During the second horizontal scan period, these outputs are (Mg+Ye) and (Gr+Cy) signals, respectively. Therefore, outputs from the differential amplifier 112 connected to the sample/hold circuits 110 and 111 are given as follows if its gain is given as K:

$$P=K[(Mg+Cy)-(Gr+Ye)]$$

$$Q=K[(Mg+Ye)-(Gr+Cy)] \quad (1)$$

The A/D converter 114 is an 8-bit A/D converter, and its conversion range is $-A/2$ mV to $A/2$ mV. The A/D converter 114 converts an input within a range of $-A/2$ to $-A/2+\Delta$ into zero and an input within a range of $(A/2-\Delta)$ to $(A/2)$ mV into 1023.

In the above description, $\Delta=A/256$ mV.

In this case, a level shifter may be connected to the input of the A/D converter, and the input range may be 0 to A mV.

A maximum value of outputs from the sample/hold circuits 110 and 111 is defined as Vmax, and an output from the differential amplifier 112 falls within the following range:

$-KV$ to $KV$ mV

Colors are different when histograms of outputs at the point A are actually examined. However, since horizontal luminance corelation is present in a difference between the horizontally adjacent signals, the range is almost $-\alpha KV$ to $\alpha KV$ mV where $\alpha$ is smaller than 1 and generally given as about 1/3.

If the parameters $\alpha$, K, V, and A satisfy relation $\alpha KV = A/2$, the full scale of the A/D converter 114 can be effectively used. Although the frequency of occurrence is low, an output at the A point may be smaller than $-\alpha KV$ or larger than $\alpha KV$. For this reason, the output is clipped by a clip circuit 113 to fall within the range of $-\alpha KV$ to $\alpha KV$. If the value $\alpha$ is closer to 1, an error of a decoder 115 becomes small. However, color quantization errors are increased. Therefore, the value $\alpha$ is preferably selected as an appropriate value. When high precision is not required, the clip circuit 113 can be omitted.

Figure 14:
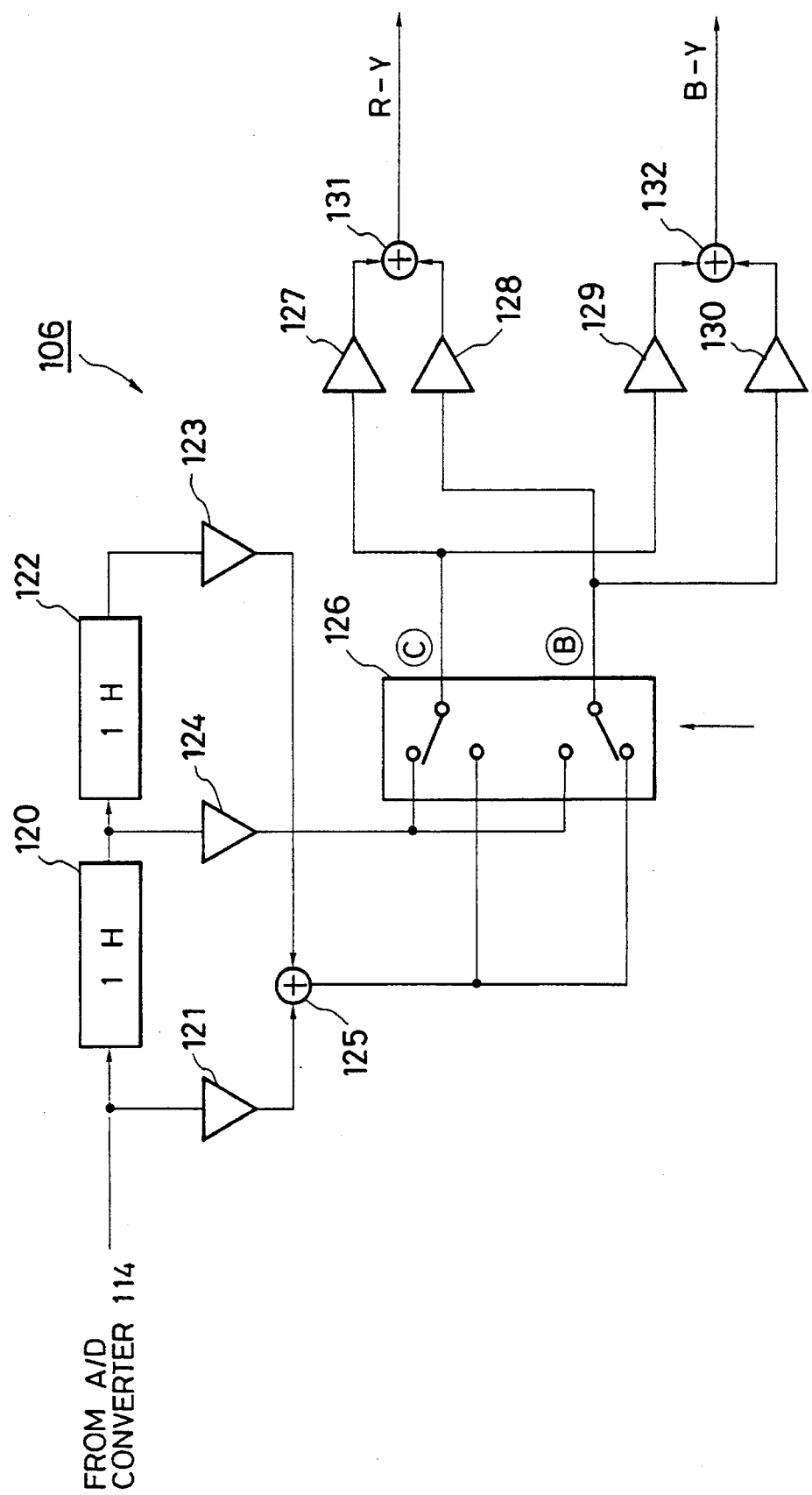
FIG. 14 is a block diagram showing an arrangement of a color signal processing circuit shown in FIG. 11.

Outputs from the A/D converter 114 are input to a color signal processing circuit 106 having an arrangement shown in FIG. 14 and are synchronized with each other. The synchronized outputs are then converted into color difference signals R–Y and B–Y.

An arrangement of the color signal processing circuit 106 will be described with reference to FIG. 14.

An output from the A/D converter 114 is input to an 1H memory 120 and a constant multiplier 121. If an input to the 1H memory 120 is a signal corresponding to, e.g., P, an input to another 1H memory 122 is Q, and an output therefrom is a signal corresponding to P.

If constants of the constant multiplier 121 and a constant multiplier 123 are given as ½ each, and a constant of a constant multiplier 124 is set to be 1, P and Q alternately appear at the outputs of an adder 125 and the constant multiplier 124 at different phases. Therefore, if these signals are input to a switch 126 and are switched every 1H, P always appears at ⓒ, and Q always appears at ⓑ, thereby synchronizing the P and Q with each other.

In the case of the color filter layout shown in FIG. 12, the following equations can be obtained.

$$P=[(Mg+Cy)-(Gr+Ye)]=2B-G\cong B-Y$$

$$Q=[(Mg+Ye)-(Gr+Cy)]=2B-G\cong R-Y$$

A color difference matrix circuit consisting of constant multipliers 127, 128, 129, and 130 and adders 131 and 132 need not be arranged. In order to obtain better color reproducibility, constants set in the constant multipliers 127 to 130 are preferably determined in accordance with spectral characteristics of the color filter. These constants may be used to adjust the gains of the color differences.

The color difference signals R–Y and B–Y are converted into analog signals by a D/A converter 108, and the converted signals are input to a standard television signal generating apparatus 109.

An operation of the decoder 115 will be described below.

Assume a horizontal scan period for repeatedly scanning the (Mg+Cy) and (Gr+Ye) signals by the filter layout.

Signals $\{V_n\}$ to be decoded are $V_1=Mg_1+Cy_1$, $V_2=Gr_1+Ye_1$, $V_3=Mg_2+Cy_2$, ....

Now assume signals $\{U_n\}$ defined by $$U_n = V_{n+1} - V_n \tag{2}$$

then $$U_1 = (Gr_1+Ye_1) - (Mg_1+Cy_1)$$

$$U_2 = (Mg_2+Cy_2) - (Gr_1+Ye_1)$$

$$U_3 = (Gr_2+Ye_2) - (Mg_2+Cy_2) \tag{3}$$

On the other hand, outputs $\{P_n\}$ from the A/D converter 114 are given as follows:

$$P_1 = (Mg_1+Cy_1) - (Gr_1+Ye_1)$$

$$P_2 = (Mg_2+Cy_2) - (Gr_1+Ye_1)$$

$$P_3 = (Mg_2+Cy_2) - (Gr_2+Ye_2) \tag{4}$$

therefore, $$U_n = (-1)^n P_n \tag{5}$$

equation (2) yields the following equation:

$$\sum_{n=1}^{k} U_{n-1} = \sum_{n=1}^{k} (V_n - V_{n-1})$$

therefore $$V_k - V_o = \sum_{n=1}^{k} U_n = \sum_{n=1}^{k} (-1)^n P_n \tag{6}$$

Equation (6) yields the following $$V_k - V_{k-1} = (-1)^k P_k \tag{7}$$

therefore $$V_k = (-1)^k P_k + V_{k-1} \tag{8}$$

Decoding is performed in accordance with equation (8).

Figure 15:
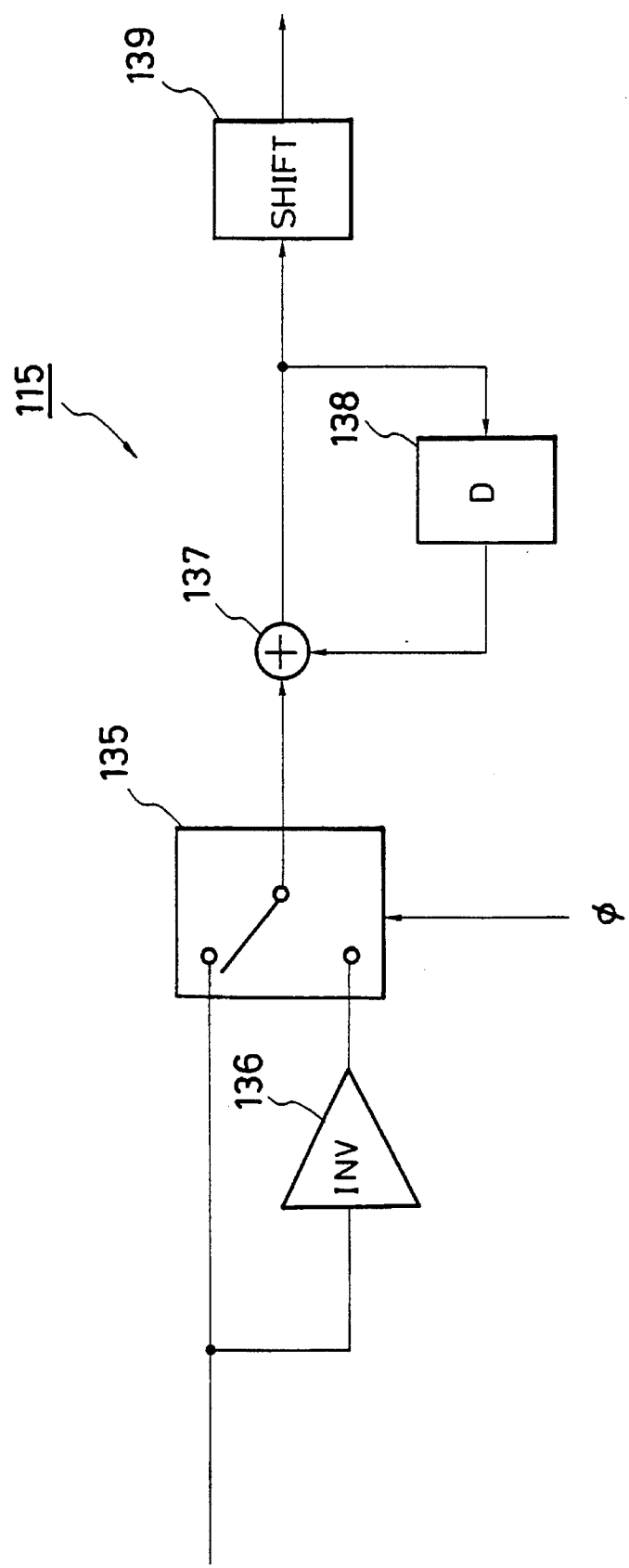
FIG. 15 is a block diagram of a decoder shown in FIG. 11.

FIG. 15 shows an arrangement of the decoder. An output from the A/D converter 114 is input to a switch 135 and a sign inverter (INV) 136. The switch 135 selects an inverted or noninverted output in response to a clock ø synchronized with a read clock of the pixel supplied from the timing generating circuit 104. An output from the switch 135 is added by an adder 137 to a signal obtained by delaying this output by one pixel by a delay circuit 138. Arithmetic precision of the adder 137 is defined as 10 to 12 bits, the number of which is larger than the of the A/D conversion precision by two to four bits, thereby preferably preventing an overflow or underflow.

The output from the adder 137 serves as a 1/α (α is the constant described above) of the maximum value of the output from the A/D converter 114. However, a resolution of 10 or more bits is sufficient in a luminance signal circuit of the subsequent stage. Therefore, the data may be uniformly shifted to the right by 0 to two bits. With the arrangement, although the precision of the A/D converter is given by 8 bits, the luminance signal can be equivalently quantized by 10 or more bits.

A luminance signal processing circuit 105 performs non-linear transform (e.g. Knee transform and gamma conversion) and filtering operations (e.g., low-pass filtering and aperture compensation). An output form the luminance signal processing circuit 105 is converted into an analog signal by a D/A converter 107. The standard television signal generating apparatus 109 generates standard television signals in response to pulses from the timing generating circuit 104 in accordance with the luminance signal and the two color difference signals.

Figure 16:
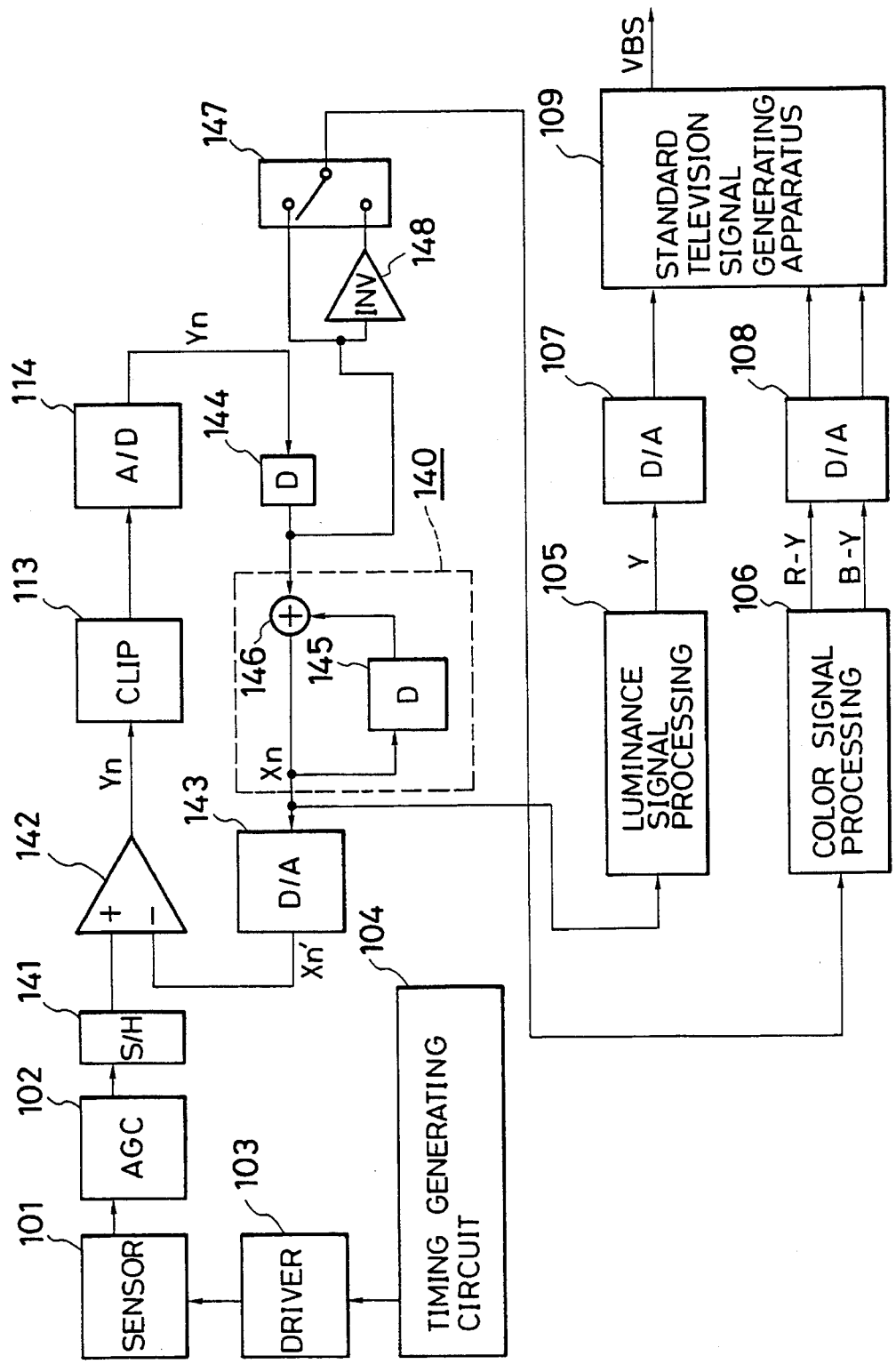
FIG. 16 is a block diagram showing an arrangement according to still another embodiment of the present invention.

FIG. 16 shows still another embodiment of the present invention. The same reference numerals as in FIG. 11 denote the same parts in FIG. 16.

Although the embodiment shown in FIG. 11 has a simple arrangement, large conversion errors of the clip circuit 113 and the A/D converter 114 adversely affect the operation within a given range. In order to obtain a high-quality image, a decoder is arranged by a portion surrounded by a dotted line in FIG. 16, and a clip circuit 113 and an A/D converter 114 are preferably inserted in a feedback loop.

An output from an AGC circuit 102 is sampled and held by a sample/hold circuit 141 at the same period as that of a sensor read clock fc. A differential amplifier 142 amplifies with an appropriate gain a difference between an output from the sample/hold circuit 141 and an output from a D/A converter 143 arranged in a feedback system.

An output from the differential amplifier 142 is clipped by the clip circuit 113, and the clipped signal is input to the A/D converter 114. The gain and the clip level, and the range of the A/D converter can be set in the same manner as in the embodiment of FIG. 11.

An output from the A/D converter 114 is delayed by a delay circuit 144, and the delayed signal is input to a decoder consisting of another delay circuit 145 and an adder 146. An output from the adder 146 is converted into an analog signal by the D/A converter 143.

The above operation will be analyzed below.

Assume that a signal from the sample/hold circuit is defined as $\{V_n\}$; an output from the differential amplifier 142, as $\{y_n\}$; an output from the A/D converter 114, as $\{U_n\}$; an output from the adder 146, as $\{x_n\}$; and an output from the D/A converter 143, as $\{X_n'\}$. The A/D converter 114 is operated in synchronism with the same period as that of the read clock fc. The outputs $\{U_n\}$ and $\{x_n\}$ are digital data respectively corresponding to clock pulses, and outputs $\{V_n\}$, $\{Y_n\}$, and $\{X_n'\}$ are analog values at the corresponding times, so that $$Y_n = V_n - X_n'$$

$$U_n = Y_n - Q_n$$

$$X_n = U_n - X_{n-1} \tag{9}$$

where $Q_n$ is errors of the clip circuit 113 and the A/D converter 114. If an error of the D/A converter 143 is very small, then $X_n = X_n'$, and the above equations can be rewritten as follows:

$$Y_n = V_n - X_n$$

$$U_n = Y_n + Q_n$$

$$X_n = U_{n-1} - X_{n-1} \tag{10}$$

Equations (10) are Z-transformed to obtain the following equations:

$$Y(Z) = V(Z) - X(Z)$$

$$U(Z) = Y(Z) - Q(Z)$$

$$X(Z) = Z^{-1} U(Z) + Z^{-1} X(Z) \tag{11}$$

When Y(Z) and V(Z) are eliminated from equations (11), $$X(Z)=Z^{-1}(V(Z)+Q(Z)) \quad (12)$$

When Y(Z) and X(Z) are eliminated from equations (11), $$U(Z)=(1-Z^{-1})(V(Z)+Q(Z)) \quad (13)$$

Similarly, the following equation can be obtained:

$$Y(Z)=(1-Z^{-1})V(Z)-Z^{-1}Q(Z) \quad (14)$$

X(Z) is a one-clock delayed signal of a sum of the original signal $\{V_n\}$ and quantization noise $\{Q_n\}$. When the signal X(Z) is directly supplied to the luminance signal processing circuit 105, the same operations as in the previous embodiment can be performed. The signal $\{y_n\}$ represents a difference between each pair of different color signals according to equation (14). In this embodiment, a difference between the adjacent color signals in the horizontal direction is A/D-converted. The resultant signal $\{U_n\}$ is equal to $\{U_n\}$ in equations (3). In order to match the phases of the color signals with that of the luminance signal, an output from the delay circuit 144 is given as $\{U_n\}$, which is then input to a switch 147 and an inverter 148. The switch 147 selects one of the outputs from the delay circuit 144 and the inverter 148 every clock fc. An output from the switch 147 is represented by $\{P_n\}$ in equations (4). Therefore, the signal $\{P_n\}$ is directly input to a color signal processing circuit 106, and the subsequent operations are the same as those of the previous embodiment.

The number of bits of the D/A converter 143 is preferably higher than that of the A/D converter 114 by two or three bits in order to equalize $X_n$ with $X_n'$. Furthermore, the number of bits of the adder 146 is preferably higher than that of the A/D converter 114 by two or three bits in order to prevent an overflow or underflow.

Signals corresponding to differences of different color signals are A/D-converted in the embodiment as in the previous embodiment, thereby generating color signals. On the other hand, the luminance signal is decoded by the decoder using the A/D-converted results, thereby increasing S/N ratios of the luminance and color signals.

The color filter layout in the above embodiment is the one shown in FIG. 12. However, any complementary color mosaic filter can be used. Alternatively, a Cy-G-Ye complementary color stripe filter may be effectively used in the present invention if color signal processing is performed using differences of the color signals or the modulation components and a luminance signal is generated by a baseband component.

According to the present invention, since the differences between the different analog color signals are calculated and A/D-converted, quantization noise of the color signals can be reduced. In addition, the original signals are decoded from the difference signals to generate the luminance signal. Therefore, only one A/D converter is required, quantization noise of the luminance signal can be reduced, and the circuit size and cost can be reduced.

When A/D conversion is performed while color signals are superposed on the luminance signal, since the amount of color signal components is smaller than that of the luminance component (about 20 to 30%), quantization noise is amplified upon amplification of the composite signal to a predetermined level.

According to the present invention, the color signals are separated from the luminance signal, and the respective signal components are independently A/D-converted to suppress quantization level of, especially, the color signals.

In this case, when the color and luminance signals are simultaneously A/D-converted, two A/D converters are required. In addition, if a luminance signal is linear, the A/D converter for the luminance signal must have precision of at least 10 bits. Even if non-linear processing such as knee is performed for the luminance signal, precision of at least 8 bits is required, and the circuit size and cost are undesirably increased.

To the contrary, according to the present invention, when the luminance signal is decoded from the output from the A/D converter, only one A/D converter as described above is required. Therefore, the circuit size and cost can be reduced.

Still another embodiment of the present invention will be described. This embodiment is based on the following findings a and b.

a. histograms of differences between color signals, i.e., color difference signals derived from a normal object exhibit almost normal distributions centered on zero.

b. Human eyes can detect even a small error in color difference signals in a region where color difference signal levels are small, i.e., almost in an achromatic color. The human eyes cannot detect errors of color difference signals in a region where color difference signals are large, i.e., the color saturation levels are sufficiently high.

Based on the above two findings, according to the present invention, a small color difference signal level is quantized by a large number of quantization levels, while a large color difference signal level is quantized by a small number of quantization levels.

Figure 17:
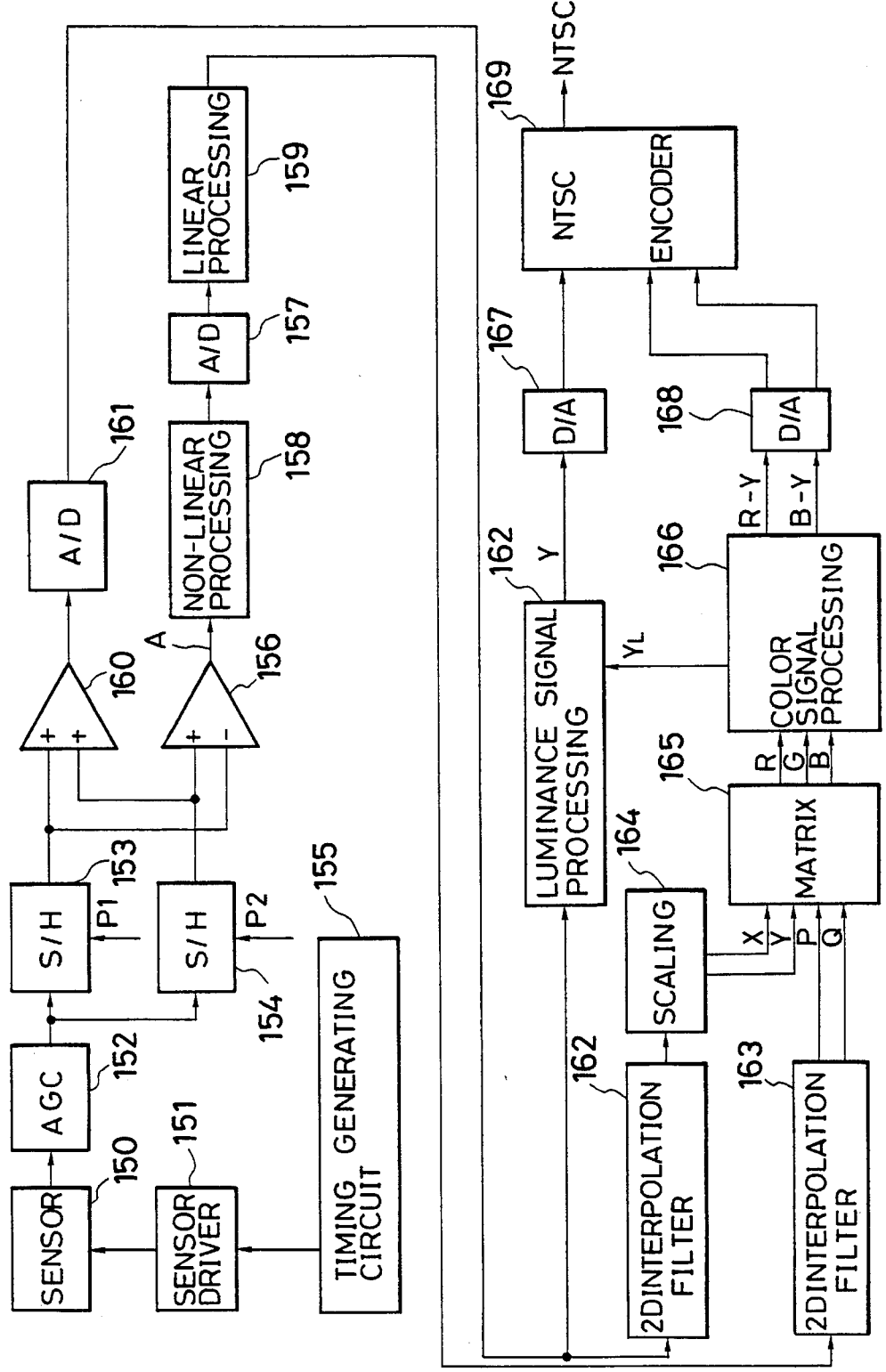
FIG. 17 is a block diagram showing an arrangement according to still another embodiment of the present invention.
Figure 19A:
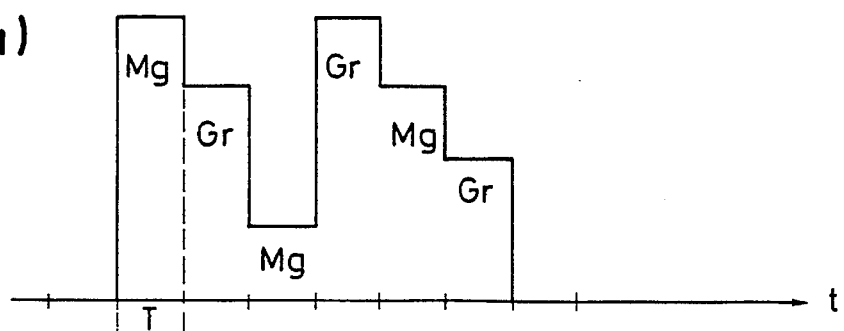
FIGS. 19($a$) to 19($e$) are timing charts showing outputs of the respective parts in the embodiment of FIG. 17.
Figure 19B:
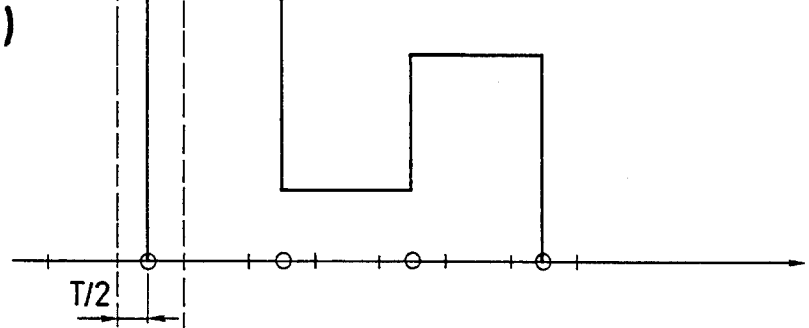
Figure 19C:
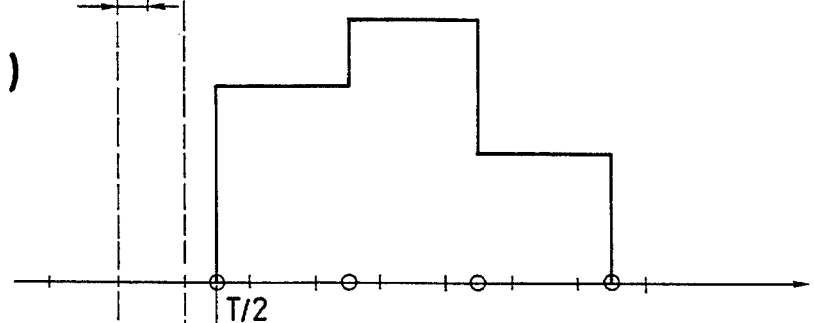
Figure 19D:
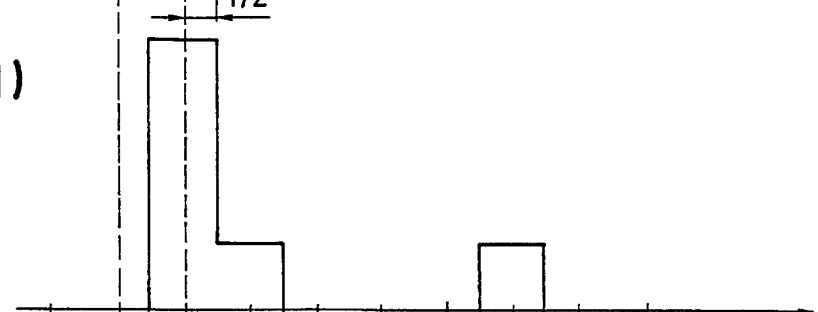
Figure 19E:
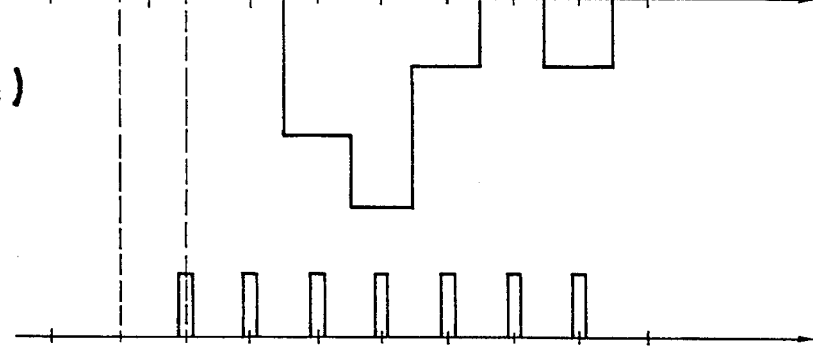

FIG. 17 is a block diagram of a video camera according to this embodiment.

Figure 18:
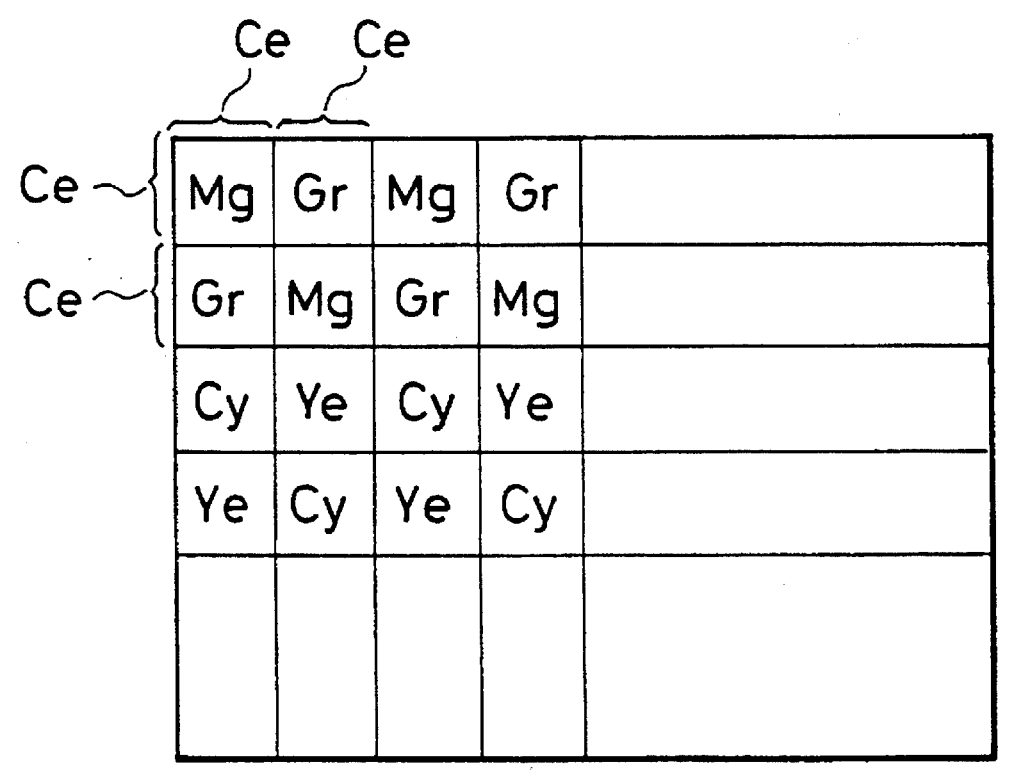

Referring to FIG. 17, a sensor 150 comprises a CCD image pickup element. A complementary color filter shown in FIG. 18 is formed on the CCD image pickup element, and charges of the sensor 150 are read by a sensor driver 151 in accordance with interlaced scanning.

The gain of the read signal is controlled by an AGC circuit 152, and the gain-controlled signal is input to two sample/hold circuits 153 and 154. Pulses P1 and P2 are supplied from a timing generating circuit 155 to the sample/hold circuits 153 and 154, respectively. The pulses P1 and P2 are synchronized at a period twice that of a sensor read clock fc and have opposite polarities, as indicated by waveforms (b) and (c) in FIG. 19.

A waveform (a), the waveforms (b) and (c), and a waveform (d) in FIG. 19 represent an output from the AGC circuit 152, outputs from the sample/hold circuits 153 and 154, and an output from a differential amplifier 156. An interval between the graduation marks of the scale represents a time interval T(=1/fc). The timings of the pulses P1 and P2 are represented by circles in the waveforms (b) and (c) in FIG. 19. The pulse timing of an A/D converter 157 is shown in a waveform (e).

Outputs from the sample/hold circuits 153 and 154 are Mg and Gr, respectively, during the first horizontal scan period and are Ye and Cy, respectively, during the second horizontal scan period. Therefore, the differential amplifier 156 connected to the sample/hold circuits 153 and 154 repeatedly and alternately outputs the following signals every 1H (horizontal scan period):

$$P=K(Mg-Gr)$$

$$Q=K(Cy-Ye) \quad (21)$$

where K is the gain of the differential amplifier 156.

As shown in FIG. 18, the order of color filter layout in the first field is opposite to that in the second field. The pulses P1 and P2 must be phase-inverted between the first and second fields.

Assume that a maximum value of outputs from the sample/hold circuits 153 and 154 is defined as V (mV). The range of outputs from the differential amplifier 156 is defined as follows:

−KV to KV mV

When histograms of outputs at the point A (upper central portion in FIG. 11) are examined, colors are different. However, since horizontal luminance correlation is present in a difference between horizontally adjacent signals, the range is almost −αKV to αKV mV where α is smaller than 1 and preferably falls within the range of 1/5 to 2/5.

Figure 20A:
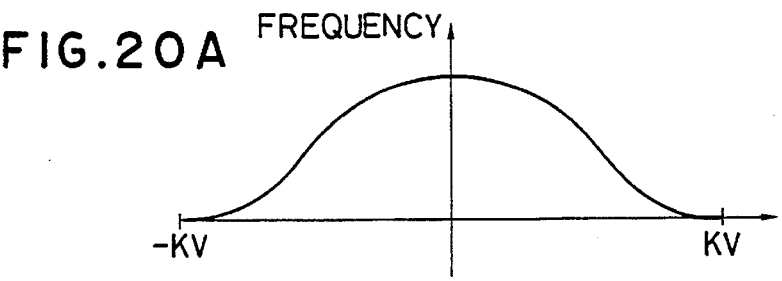
FIGS. 20A and 20B are graphs showing a non-linear processing portion shown in FIG. 17.
Figure 20B:
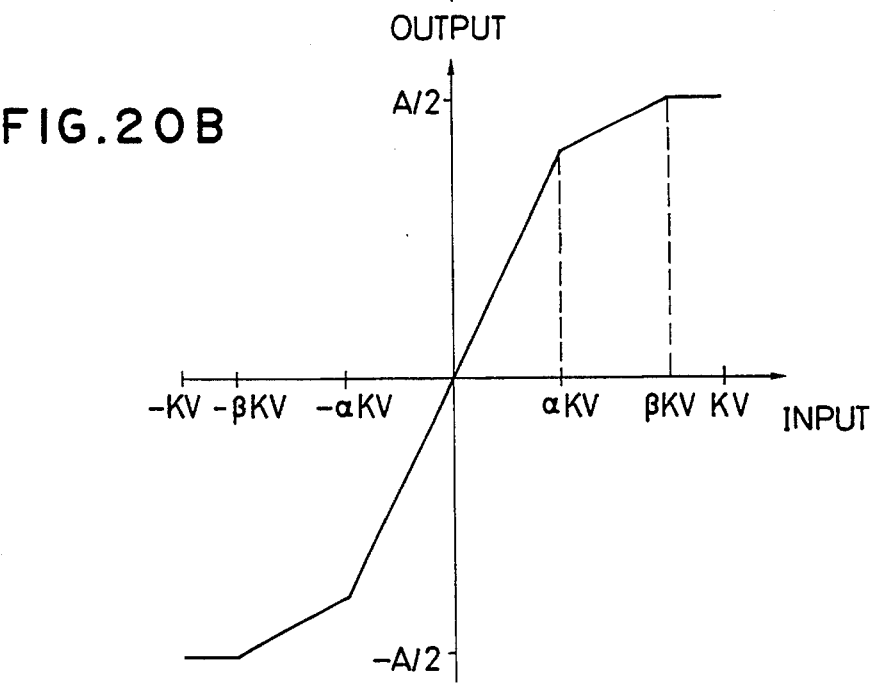

Judging from the human visual sensitivity, an error becomes conspicuous in a region having a smaller color difference signal level. Therefore, compression characteristics shown in FIG. 20B are realized by a non-linear (compression) processing portion 158.

In this embodiment, assuming α=2/5 and β=4/5, if |x|<αKV, then gradient of 2;

if αKV<|x|<βKV, then gradient of 1/2;

if |x|>βKB, then clipping

Figure 21:
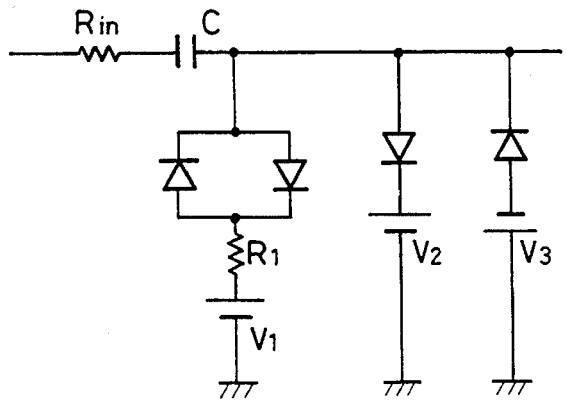
FIG. 21 is a circuit diagram of the non-linear processing portion shown in FIG. 17.

The conversion range of the A/D converter 157 is −A/2 mV to A/2 mV. This can be easily realized by using a circuit shown in FIG. 21. The first reflection point ±αKV is set to be about ±0.7 V. The second reflection point ±βKV is set to be about βKV=V/2+0.7 V and −βKV=−(V/3+0.7 V). A gradient from the first reflection point ±αKV to the second reflection point ±βKV is determined by a ratio of R1 to Rin.

The A/D converter 157 is an 8-bit linear A/D converter, and its conversion range is −A/2 mV to A/2 mV. The A/D converter 157 converts an input within a range of −A2 to −A/2+Δ into zero and an input within a range of −(A/2−Δ) to (A/2) mV into a value falling within the range of 255. A linear processing portion 159 performs liner processing of an output from A/D converter 157, which is reverse to the conversion performed by the non-linear processing portion 158. This reverse processing can be performed such that a reverse function is prestored in a ROM and data is output in response to input digital data as an address.

Outputs from the sample/hold circuits 153 and 154 are input to an adder 160. Outputs X and Y are alternately output from the adder 160 every 1H:

$X = L(Mg + Gr)$ $Y = L(Cy + Ye)$ (22)

where L is the gain of the adder 160. Therefore, the conversion range of an A/D converter 161 is preferably set to be 0 to 2LV mV.

The A/D converter 161 can have precision of 10 or more bits. However, if an 8-bit A/D converter is used, a non-linear compression circuit is connected to the input of the A/D converter 161 in the same manner as in the color signals, and the output is then converted into a linear signal.

An output from the A/D converter 161 is input to a luminance signal processing circuit 162. The luminance signal processing circuit 162 performs low-pass filtering, gamma conversion, Knee conversion, edge emphasis, luminance step difference correction, and the like, thereby generating a final luminance signal Y.

A Y low-frequency component may be corrected using a Y low-frequency correction signal $Y_L$ obtained by a technique (to be described later) in order to improve color reproducibility.

Outputs from the A/D converter 161 and the linear processing portion 159 are supplied to two-dimensional interpolation filters 162 and 163, respectively.

Figure 22:
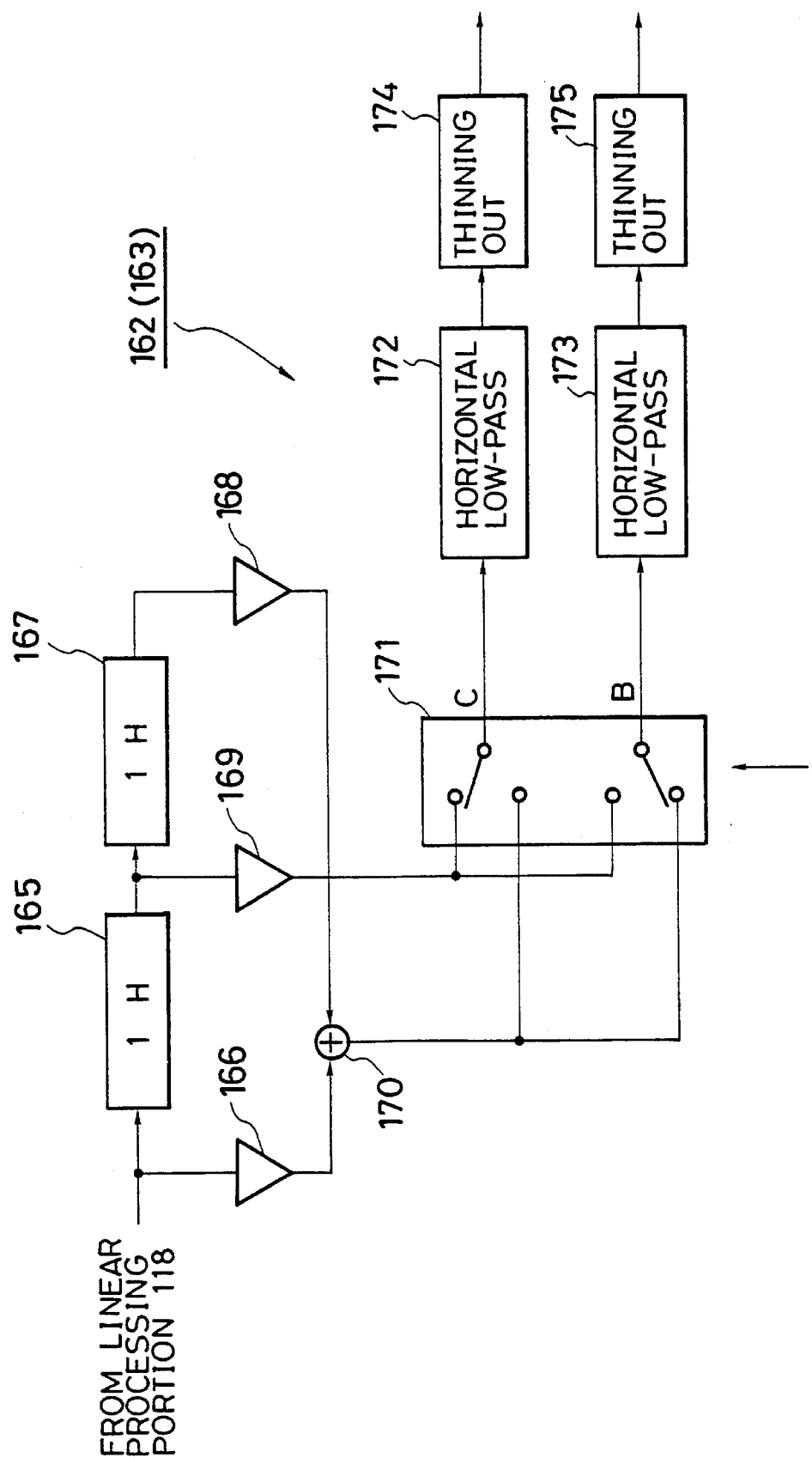
FIG. 22 is a block diagram of a two-dimensional interpolation filter shown in FIG. 17.

An arrangement of the two-dimensional interpolation filter 162 (163) is shown in FIG. 22.

An output from the linear processing portion 159 is input to a 1H memory 165 and a constant multiplier 166. If an input to the 1H memory 165 is a signal corresponding to, e.g., P, an input to an 1H memory 167 is Q, and its output is a signal corresponding to p.

When the constants of the constant multipliers 166 and 168 are set to be 1/2 each, and the constant of a constant multiplier 169 is set to be 1, P and Q alternately appear at the outputs of an adder 170 and the constant multiplier 169 every 1H so as to have different phases. If these outputs are input to a switch 171 and are switched every 1H, P always appears at the point ©, and Q always appears at the point Ⓑ thereby synchronizing them with each other and low-pass filtering them. It is deemed to be sufficient if the color range in the vertical direction is given by 160 to 240 TV. Therefore, two or more 1H memories are preferably used, or an IIR filter is preferably arranged to narrow the vertical band to minimize formation of color moiré.

Each of horizontal low-pass filters 172 and 173 is a horizontal digital low-pass filter which narrows the band by about 1 to 2 MHz. This filter may be of an FIR or IIR type.

After the band is sufficiently narrowed, the data is thinned out by thinning out portions 174 and 175 into N:1. If a clock is fc and a band is (1/fD) Hz, N is preferably selected as an integer slightly smaller than fc/fD. By this technique, subsequent matrix processing and subsequent color processing can be performed at a relatively low speed in response to the clock fD. This technique is effective to reduce power consumption.

The output from the A/D converter 161 is also input to the two-dimensional interpolation filter 163 having the same arrangement as that of the two-dimensional interpolation filter 162. Outputs from the interpolation filter 163 are two-dimensionally interpolated X and Y signals.

A scaling portion 164 will be described below. Assume that the A/D converter 161 has an 8-bit resolution, that the A/D converter 157 also has an 8-bit resolution, and that K=4. The LSB of an output from the A/D converter 161 corresponds to 2V/256 (mV), and the LSB of an output from the linear processing portion 159 corresponds to V/(4×256) (mV). The latter scale is eight times finer the former scale. Therefore, the former output is uniformly shifted to the left by 3 bits to obtain 11-bit data.

A matrix operation portion 165 will be described below.

After scaling, the following signals are assumed to be obtained:

$X = Mg + Gr$ \qquad $Y = Cy + Ye$
$P = Mg − Gr$ \qquad $Q = Cy − Ye$ so that the following matrix operation is performed:

$$\begin{bmatrix} Mg \\ Gr \\ Cy \\ Ye \end{bmatrix} = \begin{bmatrix} 1/2 & 0 & 1/2 & 0 \\ 1/2 & 0 & -1/2 & 0 \\ 0 & 1/2 & 0 & 1/2 \\ 0 & 1/2 & 0 & -1/2 \end{bmatrix} \begin{bmatrix} X \\ Y \\ P \\ Q \end{bmatrix} \quad (23)$$

Assume that Mg, Gr, Cy, and Ye can be converted into R, G, and B according to a matrix ($a_{ij}$) of A(4×3).

$$\begin{bmatrix} R \\ G \\ B \end{bmatrix} = [a_{ij}] \begin{bmatrix} 1/2 & 0 & 1/2 & 0 \\ 1/2 & 0 & -1/2 & 0 \\ 0 & 1/2 & 0 & 1/2 \\ 0 & 1/2 & 0 & -1/2 \end{bmatrix} \begin{bmatrix} X \\ Y \\ P \\ Q \end{bmatrix} \quad (24)$$

The coefficient ($a_{ij}$) is determined as follows. If the spectral characteristics of the color filters of the respective colors are given as $Mg(\lambda)$, $Gr(\lambda)$, $Cy(\lambda)$, and $Ye(\lambda)$, the coefficient ($a_{ij}$) can be determined by using the method of least squares so that the $R(\lambda)$, $G(\lambda)$, and $B(\lambda)$ determined by the following matrix are set to have ideal NTSC image pickup characteristics:

$$\begin{bmatrix} R(\lambda) \\ G(\lambda) \\ B(\lambda) \end{bmatrix} = [a_{ij}] \begin{bmatrix} Mg(\lambda) \\ Gr(\lambda) \\ Cy(\lambda) \\ Ye(\lambda) \end{bmatrix} \quad (25)$$

When the coefficient ($a_{ij}$) thus determined is used, the following matrix can be obtained:

$$\begin{bmatrix} R \\ G \\ B \end{bmatrix} = [(a_{ij})] \begin{bmatrix} 1/2 & 0 & 1/2 & 0 \\ 1/2 & 0 & -1/2 & 0 \\ 0 & 1/2 & 0 & 1/2 \\ 0 & 1/2 & 0 & -1/2 \end{bmatrix} \begin{bmatrix} X \\ Y \\ P \\ Q \end{bmatrix} = \quad (26)$$

$$\frac{1}{2} \begin{bmatrix} a_{11}+a_{12} & a_{13}+a_{14} & a_{11}-a_{12} & a_{13}-a_{14} \\ a_{21}+a_{22} & a_{23}+a_{24} & a_{21}-a_{22} & a_{23}-a_{24} \\ a_{31}+a_{32} & a_{33}+a_{34} & a_{31}+a_{32} & a_{33}+a_{34} \end{bmatrix} \begin{bmatrix} X \\ Y \\ P \\ Q \end{bmatrix}$$

This calculation is performed once per Fc/N clock.

In order to prevent false colors reproduced along the vertical direction, the coefficient ($a_{ij}$) satisfies the following conditions:

$$a_{11}+a_{12}=a_{21}+a_{22}=a_{31}+a_{32}=2U$$

$$a_{13}+a_{14}=a_{23}+a_{24}=a_{33}+a_{34}=2V \quad (27)$$

where U and V are constants.

Therefore, matrix (26) can be rewritten as follows:

$$\begin{bmatrix} R \\ G \\ B \end{bmatrix} = \frac{1}{2} \begin{bmatrix} U & V & a_{11}-a_{12} & a_{13}-a_{14} \\ U & V & a_{21}-a_{22} & a_{23}-a_{24} \\ U & V & a_{31}-a_{32} & a_{33}-a_{34} \end{bmatrix} \begin{bmatrix} X \\ Y \\ P \\ Q \end{bmatrix} \quad (28)$$

According to matrix (28), the (UX+VY) operation portions of the R, G, and B are common, so that these portions are calculated first, and then other portions are calculated later, thereby reducing the number of operation circuits and operation time.

The R, G, and B outputs from the matrix operation portion 165 are input to a color signal processing portion 166. This processing portion 166 performs white balance processing, gamma conversion, and color difference matrix processing, thereby outputting color difference signals R−Y and B−Y.

The luminance signal Y is converted into an analog signal by a D/A converter 167, and the color difference signals R−Y and B−Y are converted into analog signals by a D/A converter 168. These analog signals are input to a standard television signal generating apparatus 169. The generating apparatus 169 then generates a standard television signal NTSC.

Still another embodiment of the present invention will be described with reference to FIG. 23.

Figure 23:
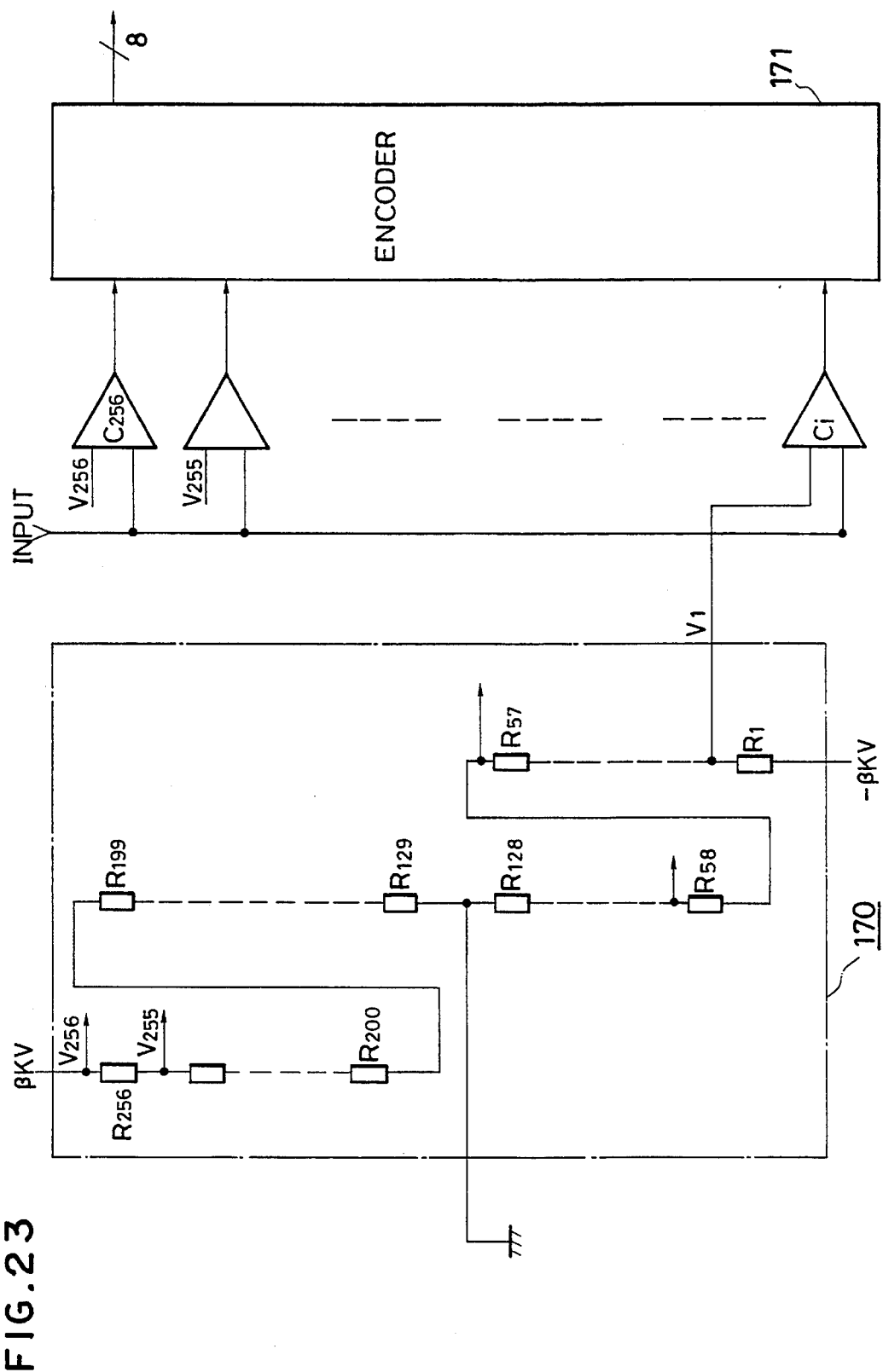
FIG. 23 is a block diagram showing a main part according to still another embodiment of the present invention.

In this embodiment, an A/D converter having an arrangement shown in FIG. 23 is used in place of the non-linear processing portion 158 and the A/D converter 157 in the arrangement of FIG. 17.

A resistor voltage-dividing circuit 170 comprises 256 resistors Ri (i: 1 to 256). For example, the resistance of each of the resistors R256 to R200 and the resistors R1 to R57 is given as 4R, and the resistance of each of the resistors R58 to R128 and the resistors R129 to R199 is given as R. The resistors R256 and R1 are connected to external reference voltage sources +βKV (mV) and βKV (mV), respectively. A connecting point between the resistors R129 and R128 is grounded. Comparators Ci (i: 1 to 256) compare an input voltage with voltages at the resistors Ri. These 256 results are input to an encoder 171, and the results are encoded in units of 8 bits.

Characteristics shown in FIG. 20B can be obtained by using the A/D converter having the above arrangement. Other arrangements of this embodiment are the same as those of the embodiment shown in FIG. 17.

As has been described above, according to the present invention, the outputs from the differential amplifying means are A/D-converted, and then linear processing is performed. The color difference signals are quantized by a larger number of quantization levels when their levels are low. Otherwise, the color difference signals are quantized by a smaller number of quantization levels. Therefore, quantization noise (errors) is not conspicuous from the human visual sensibility, thereby providing an image pickup signal processing apparatus capable of producing a high-quality image pickup signal.

What is claimed is:

1. An image pickup signal processing apparatus for generating a digital luminance signal and digital color difference signals from output signals from a solid-state image pickup element, comprising:

operation means for generating primary color signals or color difference signals from the output signals from said solid-state image pickup element;

an A/D converter for converting the output signals of said solid-state image pickup element and the primary color or color difference signals output from said operation means into digital signals, a quantization level of said A/D converter being variably set according to the level of said output signals of said solid-state image pickup element and the output signals having a small level being quantized by a large number of quantization levels;

gamma correction means for gamma correcting the color difference signals output from said A/D converter by using a correction table which provides corrected color difference signals from a luminance signal level included in the output signals of said solid-state image pickup element which is A/D-converted by said A/D converter, and a color difference signal level.

2. An apparatus according to claim 1, wherein DC potentials of the color difference signals input to said A/D converter are set such that zero levels of the color difference signals are located at a middle point of an input range of said A/D converter.

3. An apparatus according to claim 1, wherein an output signal level of said operation means is variably changed in accordance with an input range of said A/D converter.

4. An image pickup signal processing apparatus comprising:
   a) image pickup means for photoelectrically converting image pickup light from an object to be photographed and for obtaining complementary color signals;
   b) means for generating primary color signals from the obtained complementary color signals;
   c) signal processing means comprising an amplifier, for processing the primary color signals, said amplifier variably controlling levels of said primary color signals;
   d) an A/D converter having an input range, for A/D-converting the processed primary color signals whose levels are variably controlled in accordance with the input range of said A/D converter;
   e) means for generating color difference signals from outputs from said A/D converter; and
   f) means for generating a luminance signal from the complementary color signals converted from the outputs of said A/D converter.

5. An image pickup signal processing apparatus comprising:
   color image pickup means using a complementary color filter for providing a plurality of different complementary color signals formed by using a differential amplifier which receives outputs from two sample/hold circuits operated to have opposite phases and operated at a period twice of a period of a read clock of said color image pickup means;
   an A/D converter for A/D-converting a plurality of different signals each representing a difference between said plurality of different complementary color signals outputted from said color image pickup means;
   color signal processing means for processing signals outputted from said A/D converter to generate color difference signals;
   a decoder for decoding the signals outputted from said A/D converter to provide the plurality of different complementary color signals outputted from said color image pickup means; and
   a luminance signal processing means for processing signals outputted from said decoder to generate a luminance signal.

6. An apparatus according to claim 5, wherein the plurality of different complimentary color signals are formed by using a differential amplifier which receives an output from a sample/hold circuit having the same period as that of a read clock of said color image pickup means and an output from a D/A converter to which is applied a digital signal provided by a decoder for decoding the signals outputted from said A/D converter.

7. An image pickup signal processing apparatus comprising:
   color image pickup means using a complementary color filter;
   an A/D converter for A/D-converting signals corresponding to differences between different color signals output from said color image pickup means;
   color signal processing means for forming color signals by using outputs from said A/D converter;
   a decoder for decoding original color signals from the outputs of said A/D converter; and
   a luminance signal processing unit for forming a luminance signal using an output from said decoder,
   wherein said decoder includes switch means for alternately outputting the output from said A/D converter and an inverted output thereof every pixel period and adding means for adding an output from said switch means and an output obtained by delaying the output from said switch means by one pixel.

8. An apparatus according to claim 5, wherein the complementary color filter includes Mg, Gr, Cy, and Ye filters.

9. An apparatus according to claim 5, wherein said color image pickup means includes a CCD.

10. An apparatus according to claim 5, wherein the levels of the signals corresponding to the differences of the color signals and supplied to said A/D converter are limited in accordance with an input range of said A/D converter.

11. An image pickup signal processing apparatus comprising:
   means for time-divisionally A/D converting signals corresponding to differences of complementary color signals provided form image pickup means having a complementary color filter; and
   means for generating color difference signals and a luminance signal of primary color signals from the complementary color signals generated by decoding the A/D converted signals, wherein a quantization level of the A/D conversion of said signals is variably set according to an output level of said image pickup means and said signals having a small level are quantized by a large number of quantization levels.

12. An apparatus according to claim 11, wherein the complementary color signals include Mg, Gr, Cy, and Ye, and the color difference signals include R–Y and B–Y.

13. An image pickup signal processing apparatus comprising:
   color image pickup means using a complementary color filter;
   means for receiving an output from said color image pickup means and separating complementary color signals;
   differential amplifying means for receiving a plurality of complementary color signals separated by said separating means;
   A/D-converting means for non-linearly A/D-converting an output from said differential amplifying means; and
   processing means for performing linear processing of an output from said A/D-converting means,
   wherein a signal having a small level is quantized by a large number of quantization levels.

14. An apparatus according to claim 13, wherein said A/D-converting means comprises a resistor voltage-dividing circuit for generating voltage-divided outputs locally having different values, and a plurality of comparators using the voltage-divided outputs as reference values.

15. An apparatus according to claim 13, wherein said color image pickup means includes a CCD.

16. An apparatus according to claim 13, wherein said separating means includes two sample/hold circuits driven by sampling pulses having opposite phases at a period twice that of a read clock of said color image pickup means.

17. An apparatus according to claim 13, wherein said A/D-converting means includes a non-linear circuit for converting an input signal into a non-linear signal and outputting the non-linear signal, and an A/D converter for A/D converting an output from said non-linear circuit.

18. An apparatus according to claim 17, wherein said non-linear circuit comprises time constant elements and generates a constant output when an input level exceeds a predetermined value.

19. An apparatus according to claim 17, wherein said color image pickup means includes a CCD.

20. An image signal processing apparatus including color image pickup means having a complementary color filter for photoelectrically converting light from an object, for generating primary color signals by digitally processing an output of said color image pickup means, comprising:

(a) A/D conversion means for A/D-converting the output of said image pickup means with a predetermined quantization level;

(b) means for changing the quantization level according to a level of the output of said image pickup means so that the output having a small level is quantized by a large number of quantization levels.

21. An apparatus according to claim 20, wherein said complementary color filter includes Mg, Gr, Ye and Cy filters, and the primary color signals include R, G and B.

22. An apparatus according to claim 20, wherein said color image pickup means includes a CCD.

23. An image signal processing apparatus including color image pickup means having a complementary color filter for photoelectrically converting light from an object, for generating primary color signals by digitally processing an output of said color image pickup means, comprising:

A/D conversion means for A/D-converting the output of said image pickup means with a plurality of quantization levels; and means for changing the quantization levels according to a level of the output of said image pickup means so that the output having a small level is quantized by a larger number of quantization levels.

24. An apparatus according to claim 23, wherein said complementary color filter includes Mg, Gr, Ye and Cy filters, and the primary color signals include R, G and B.

25. An apparatus according to claim 23, wherein said color image pickup means includes a CCD.

* * * * *

UNITED STATES PATENT AND TRADEMARK OFFICE
CERTIFICATE OF CORRECTION

PATENT NO. : 5,457,494
DATED : October 10, 1995
INVENTOR(S) : Suga et al.

Figure 13A:
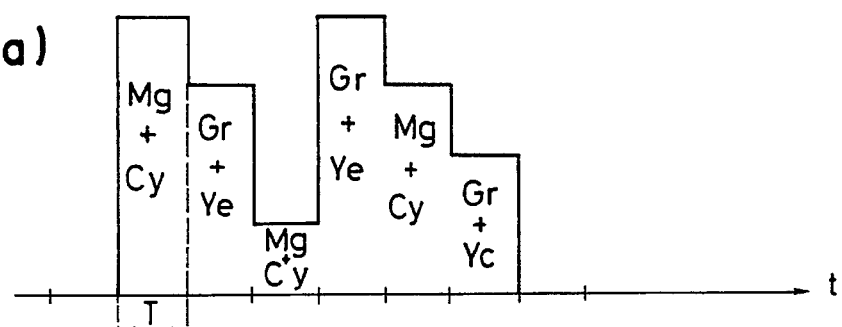
FIGS. 13($a$) to 13($e$) are views for explaining an operation shown in FIG. 11.
Figure 13B:
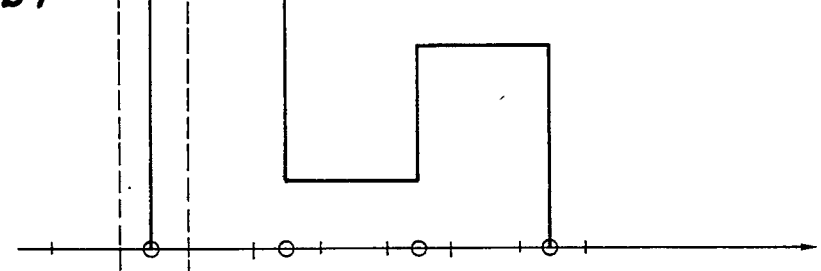
Figure 13C:
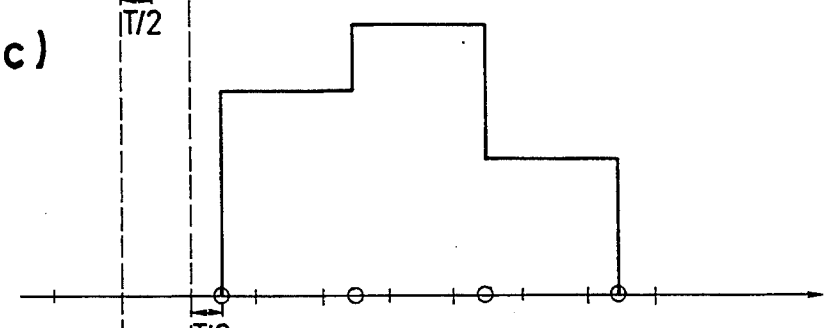
Figure 13D:
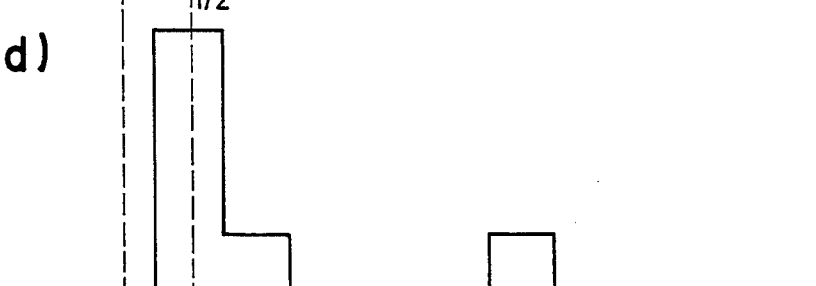
Figure 13E:
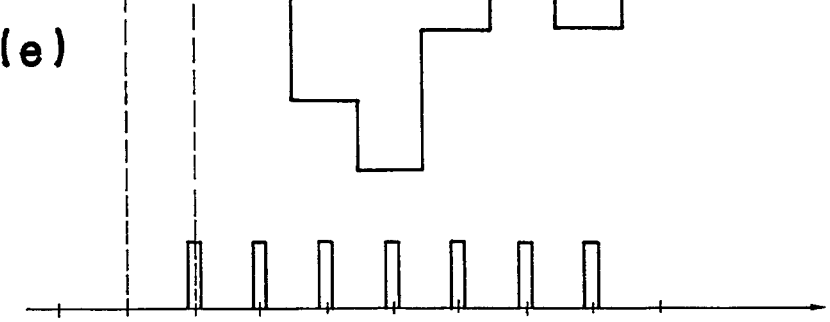

It is certified that error appears in the above-indentified patent and that said Letters Patent is hereby corrected as shown below:

COLUMN 4
    Line 12, "FIG. 11; FIGS. 13(a)" should read
--FIG. 11;
    FIGS. 13(a)--.

COLUMN 6
    Line 3, "G(n+1)+Ye(n+1)" should read
--G(n+1')+Ye(n+1')--.

COLUMN 7
    Line 3, "no" should be deleted.

COLUMN 9
    Line 54, "the of" should read --that of--.

COLUMN 10
    Line 34, "circuit" should read --circuit 141--; and
    Line 43, "$\{V_n 56 ,$" should read --$\{V_n\},$--.

COLUMN 13
    Line 20, "$|x|>\beta KB,$" should read --$|x|>\beta KV,$--; and
    Line 50, "precision" should read --a precision--.

COLUMN 14
    Line 7, "p." should read --P.--.

UNITED STATES PATENT AND TRADEMARK OFFICE
CERTIFICATE OF CORRECTION

PATENT NO. : 5,457,494
DATED : October 10, 1995
INVENTOR(S) : Suga et al.

It is certified that error appears in the above-indentified patent and that said Letters Patent is hereby corrected as shown below:

COLUMN 15
    Line 33, "$a_{31}+a_{32} \quad a_{33}+a_{34} \quad a_{31}+a_{32} \quad a_{33}+a_{34}$" should read --$a_{31}+a_{32} \quad a_{33}+a_{34} \quad a_{31}-a_{32} \quad a_{33}-a_{34}$--.

COLUMN 16
    Line 15, "$+\beta KV(mV)$ and $\beta KV(mV)$," should read -- $+\beta KV(mV)$ and $-\beta KV(mV)$,--.

COLUMN 17
    Line 48, "complimentary" should read --complementary--; and
    Line 51, "means" should read --means,--.

COLUMN 18
    Line 19, "form" should read --from--.

Signed and Sealed this

Twentieth Day of February, 1996

Attest:

BRUCE LEHMAN

Attesting Officer      Commissioner of Patents and Trademarks